United States Patent
Yue et al.

(10) Patent No.: US 9,768,928 B1
(45) Date of Patent: Sep. 19, 2017

(54) HIGH DIMENSIONAL (HIDI) RADIO ENVIRONMENT CHARACTERIZATION AND REPRESENTATION

(71) Applicant: Futurewei Technologies, Inc., Plano, TX (US)

(72) Inventors: Guosen Yue, Edison, NJ (US); Xiao-Feng Qi, Westfield, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/382,325

(22) Filed: Dec. 16, 2016

(51) Int. Cl.
| | | |
|---|---|---|
| *H04B 17/00* | (2015.01) | |
| *H04L 5/00* | (2006.01) | |
| *H04B 1/00* | (2006.01) | |
| *H01Q 21/00* | (2006.01) | |
| *H01Q 1/24* | (2006.01) | |
| *H04W 4/02* | (2009.01) | |
| *G01S 5/02* | (2010.01) | |
| *H04W 72/04* | (2009.01) | |

(52) U.S. Cl.
CPC .......... *H04L 5/0048* (2013.01); *G01S 5/0252* (2013.01); *G01S 5/0268* (2013.01); *H01Q 1/246* (2013.01); *H01Q 21/00* (2013.01); *H04B 1/0007* (2013.01); *H04W 4/025* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 7,027,429 B2* | 4/2006 | Laroia | ................. | H04L 27/2659 370/350 |
| 7,558,245 B2* | 7/2009 | Laroia | ................. | H04L 27/2659 370/350 |
| 8,218,665 B2* | 7/2012 | Chin | ................... | H04L 27/2657 375/262 |
| 8,483,298 B2* | 7/2013 | Ko | ....................... | H04L 27/2656 370/210 |
| 8,644,363 B2* | 2/2014 | Li | ....................... | H04L 25/0204 370/252 |
| 2010/0085866 A1* | 4/2010 | Li | ....................... | H04L 25/0204 370/208 |
| 2014/0205028 A1* | 7/2014 | Bogdan | ............. | H03K 5/15013 375/260 |

* cited by examiner

*Primary Examiner* — Tuan A Tran
(74) *Attorney, Agent, or Firm* — Vierra Magen Marcus LLP

(57) ABSTRACT

A device comprises a memory that stores instructions executed by one or more processors to obtain a plurality of received signals transmitted by a user equipment from a plurality of antenna elements in a cellular network. A plurality of complex channel values are calculated in an angle domain for a horizontal arrival angle and a vertical arrival angle per a received ray in a plurality of received rays in response to the plurality of received signals. A frequency-offset estimation is calculated and applied to the plurality of complex channel values. The plurality of offset complex channel values are transformed to a plurality of channel values in a time domain. A time-offset estimation is calculated and applied to the plurality of channel values. An expected value of the plurality of channel values is obtained to obtain a power angle delay profile for the geographical location of the user equipment.

20 Claims, 19 Drawing Sheets

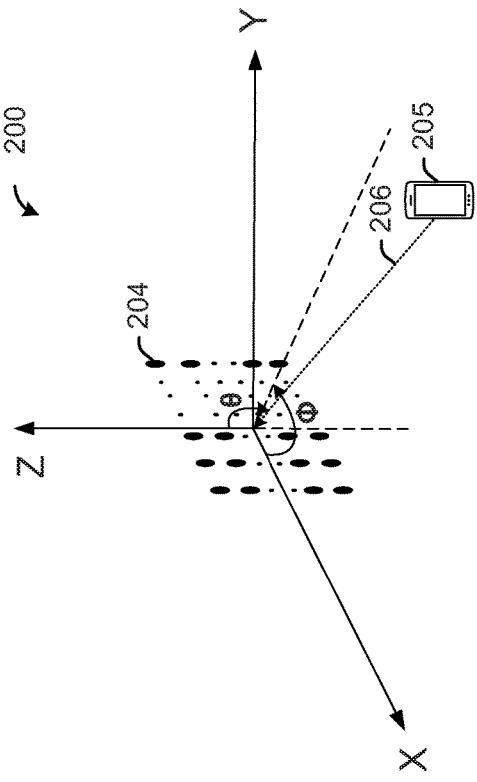

Power Angle Delay Profiles (PADPs)

The radio channel for each location is represented with power and delay profiles for each angle arrived at the base station $\phi$ = angle of arrival, horizontal
$\theta$ = angle of arrival, vertical $\{P_s, \theta_s, \Phi_s, \tau_s | s=1, ..., N_{rays}\}$ ⟵ 201

The delay may be relative delay to the first channel tap arrived at the base station.

$\{P_s, \theta_s, \Phi_s, \tau_s - \tau_1 | s=1, ..., N_{rays}\}$ ⟵ 202

It is assumed that the transmit power at different location is normalized to the unit and $\tau_1$ = min $\tau_s$

Fig. 2

Time-offset estimation equations 350

$$h(t) = \sum h_s(t) = \sum h_s(\theta_s, \phi_s) \delta(t - \tau_s) \quad \text{— 351}$$

$$H_s(k) = h_s(\theta_s, \phi_s)e^{-j2\pi\Delta kf\tau_s} \quad \text{— 352}$$

$$R_{k,k'} = H_s(k)H_s(k')^* = |h_s(\theta_s, \phi_s)|^2 e^{-j2\pi(k-k')\Delta kf\tau_s} \quad \text{— 353}$$

Time-offset: obtain angular phase $\angle R_{k,k'}$ of $R_{k,k'}$ — 354

$$\tau_s = \frac{\angle R_{k,k'}}{2\pi(k-k')\Delta f} = \frac{\angle H_s(k)H_s(k')^*}{2\pi(k-k')\Delta f} \qquad \Delta f: \text{OFDM subcarrier spacing}$$

Obtain average correlation on the estimated channel: $\hat{H}_s(k)$ — 355

$$\hat{R}_{k,k+\Delta k} = E\{H_s(k)H_s(k+\Delta k)^*\} = \frac{1}{N}\sum_k \hat{H}_s(k)\hat{H}_s(k+\Delta k)^*$$

Time-offset estimation: $\hat{\tau}_s = \dfrac{\angle \hat{R}_{k,k+\Delta k}}{2\pi\Delta k\Delta f}$ — 356

*Fig. 3B*

Frequency-offset estimation equations 375

$H_s(k, l) = h_s(\theta_s, \phi_s)e^{-j2\pi k \Delta f_s t} e^{-j2\pi\epsilon_f t}|_{t=lT_s}$ ← 376

$T_s$: OFDM symbol period
$\epsilon_f$: frequency-offset $R_{kl,kl'} = H_s(k,l) H_s(k,l')^* = |h_s(\theta_s, \phi_s)|^2 e^{j2\pi\epsilon_f(l-l')}$ ← 377

$|l-l'|$ small

Frequency-offset: obtain angular phase $\angle R_{kl,kl'}$ of $R_{kl,kl'}$ $$\epsilon_f = \frac{\angle R_{kl,kl'}}{2\pi(l'-l)T_s} = \frac{\angle H_s(k,l)H_s(k,l')^*}{2\pi(l'-l)T_s}$$ ← 378

Obtain average correlation on the estimated channel:

$$\hat{R}_{l,l+\Delta l} = E\{H_s(k,l)H_s(k,l+\Delta l)^*\} = \frac{1}{N}\sum_k \hat{H}_s(k,l)\hat{H}_s(k,l+\Delta l)^*$$ ← 379

Frequency-offset estimation: $\hat{\epsilon}_f = \dfrac{\angle \hat{R}_{l,l+\Delta l}}{2\pi\Delta l T_s}$ ← 380

*Fig. 3C*

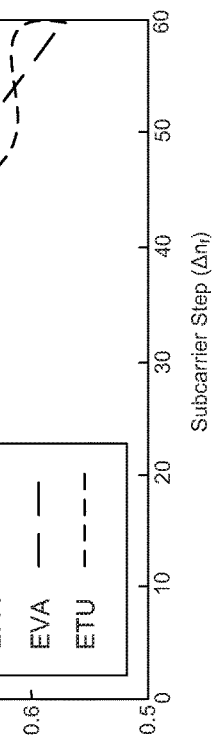
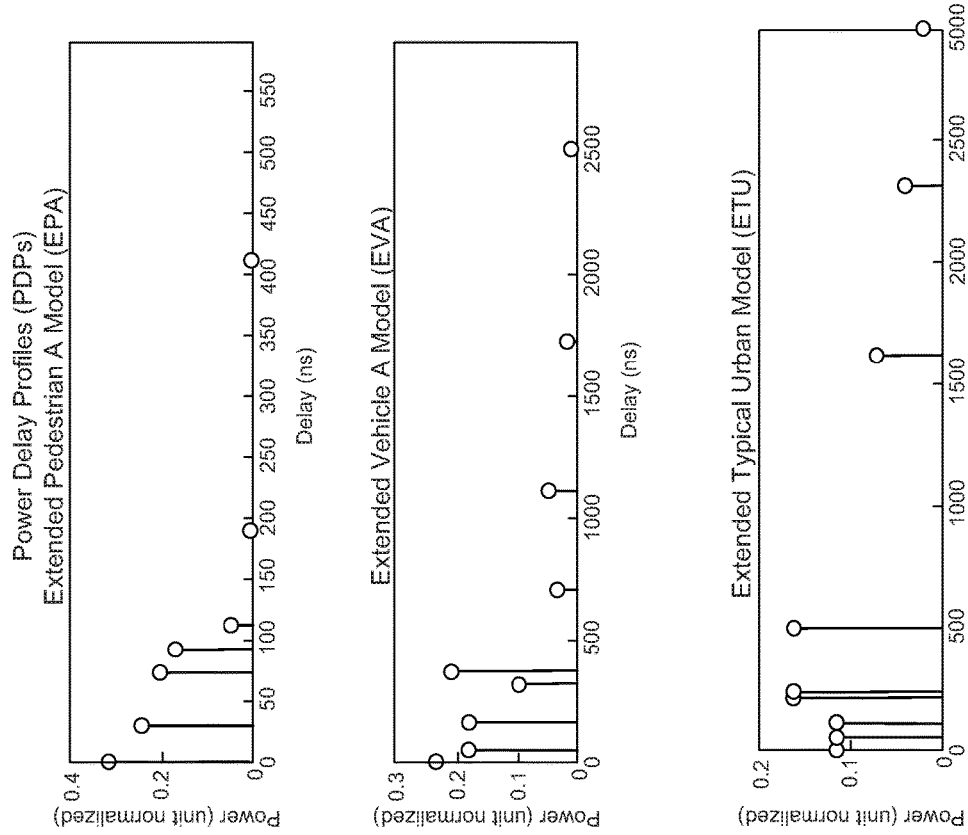
Fig. 3D
Fig. 3E

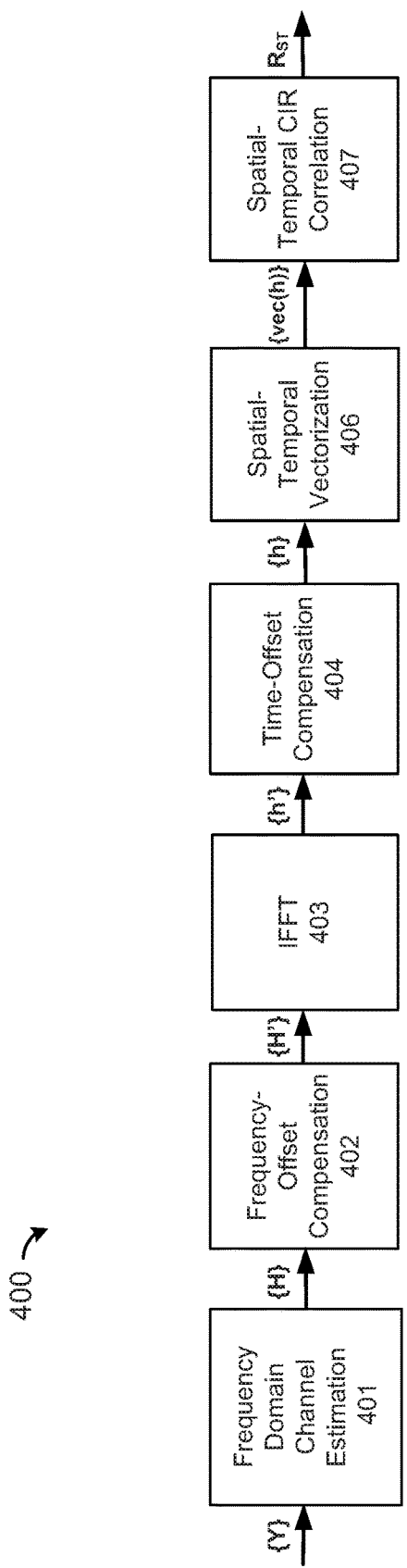

Fig. 4A

{Y}: received signal set {$y_{mk}$} over multiple time instances
$y_{mk}$: received signal at the $m$-th antenna, $k$-th subcarrier
$H_{mk}$: estimated channel state in the frequency domain
$h_{mn}$: estimated channel state in the time domain
$M$: number of transmit antenna at the base station
$\Delta f$: frequency offset
$\Delta T$: timing offset
$N_{TS}$: number of time domain channel sampling point for ST correlation estimations $$R_{mn,m'n'} = E\{h_{m,n}h^*_{m'n'}\} = E\left\{\underbrace{\left(\sum_k\sum_s h_s e^{-j2\pi k\Delta f(\tau_s-\tau_1)}e^{j\pi(m-m')\sin\theta_s}e^{j\frac{2\pi(k-k')n}{N_{FFT}}}\right)}_{450a}\underbrace{\left(\sum_{k'}\sum_{s'} H_{s'} e^{-j2\pi k'\Delta f\underbrace{(\tau_{s'}-\tau_1)}_{\text{Delay relative to first tap}}}\underbrace{e^{j\pi(m'-1)\sin\theta_{s'}}}_{\text{Angle}}e^{j\frac{2\pi k'n}{N_{FFT}}}\right)^*}_{450b}\right\}$$

$$= \sum_k\sum_s \underbrace{(p_s}_{\text{Power}} e^{-j2\pi(k-k')\Delta f(\tau_s-\tau_1)}e^{j\pi(m-m')\sin\theta_s}e^{j\frac{2\pi k n}{N_{FFT}}}e^{j\frac{2\pi(m'-1)\sin\theta_s}{}}e^{j\frac{2\pi k'n}{N_{FFT}}^*}$$

450c

Eigen Decomposition: $R_{ST} = U^{(r)}\Lambda^{(r)}U^{(r)H}$ ⟵ 451

Radio environment representations: $\{U^{(r)}, \Lambda^{(r)}, P\}$ ⟵ 452

Fig. 4B

Spatial-frequency CIR Correlations

HIGH DIMENSIONAL (HIDI) RADIO ENVIRONMENT CHARACTERIZATION AND REPRESENTATION

BACKGROUND

Knowing the radio environment around a cellular base station (BS) may help improve the performance of a BS. For example, user handover, radio resource management, link adaptation and channel estimation may be improved by knowing the radio environment, or signal characterizations of received signals from various locations near the BS.

Some BSs may be located in rural areas with a generally flat topography where received signals from user equipment (UE) located at various positions may have similar received signal characteristics. Other BSs may be located in an urban area with clusters of buildings of various shapes and sizes along with open areas, such as parks or bodies of water. In this type of radio environment, received signals from UEs at various locations may have very different signal characteristics, or channel representations.

Drive tests may be used to obtain a radio environment maps for various BSs. However, these drive tests may be costly. Further, a radio environment map may consist of one dimensional scalars, such as received power or signal-to-noise (SNR) values for particular locations. These one dimension map representations may not be good enough to capture the uniqueness of radio characteristics at a particular location.

SUMMARY

In a first embodiment, the present technology relates to a device comprising one or more processors communicating with a non-transitory memory that stores instructions. The one or more processors execute the instructions to obtain a plurality of received signals transmitted by a user equipment from a plurality of antenna elements in a cellular network. A plurality of complex channel values are calculated in an angle domain for a horizontal arrival angle and a vertical arrival angle per a received ray in a plurality of received rays in response to the plurality of received signals. A frequency offset estimation is calculated for the plurality of complex channel values. The frequency-offset estimation is applied to the plurality of complex channel values to obtain a plurality of offset complex channel values for the horizontal arrival angle and the vertical arrival angle per the received ray. The plurality of offset complex channel values for the horizontal arrival angle and the vertical arrival angle per the received ray are transformed to a plurality of channel values in a time domain for the horizontal arrival angle and vertical arrival angle with a first time delay per the received ray. A time-offset estimation is calculated for the plurality of channel values in the time domain. The time-offset estimation is applied to the plurality of channel values in the time domain to obtain a plurality of channel values for the horizontal arrival angle and vertical arrival angle with a second time delay per the received ray. An expected value of the plurality of channel values is obtained to obtain a power value for the horizontal arrival angle and vertical arrival angle having a second time delay per the received ray.

A second embodiment in accordance with the first embodiment, wherein the plurality of received signals includes a plurality of orthogonal frequency-division multiplexing (OFDM) signals and the plurality of antenna elements are included in a multiple-input and multiple-output (MIMO) antenna.

A third embodiment in accordance with the second embodiment, wherein the plurality of OFDM signals include a plurality of sounding reference signals in a plurality of subcarrier signals of a resource block transmitted by the user equipment.

A fourth embodiment in accordance with the third embodiment, wherein calculate a plurality of complex channel values in the angle domain includes: obtain an angle domain based channel estimation and providing the plurality of received signals to the angle domain based channel to obtain the plurality of complex channel values.

A fifth embodiment in accordance with the fourth embodiment, wherein obtain the angle domain based channel estimation includes using an array signal processing that includes one of N-point discrete fourier transform (DFT) steering, minimum variance distortionless response (MVDR) and multiple signal classification (MUSIC).

A sixth embodiment in accordance with the first embodiment, wherein the one or more processors execute the instructions to: obtain a geographical location for the user equipment and store the power value for the horizontal arrival angle and vertical arrival angle having a second time delay per the received ray for the geographical location in another non-transitory memory.

A seventh embodiment in accordance with the sixth embodiment, wherein the device is included in a base station having the plurality of antenna elements for communicating with the user equipment in the cellular network, wherein the one or more processors execute the instructions to: retrieve the power value for the horizontal arrival angle and vertical arrival angle having a second time delay per the received ray for the geographical location to use in one of user handover, radio resource management, link adaptation and channel estimation in the base station.

In another embodiment, the present technology relates to a computer-implemented method for a base station having a plurality of antennas to communicate with a user equipment in a cellular network. The computer-implemented method receives a plurality of subcarrier signals in an OFDM signal at a plurality of time intervals transmitted by the user equipment from the plurality of antennas. A channel is calculated in a frequency domain in response to the plurality of subcarrier signals and a frequency-offset estimation is calculated. The frequency-offset estimation is applied to the channel in the frequency domain to obtain frequency-offset compensated channel in the frequency domain. The frequency-offset compensated channel in the frequency domain is transformed to a channel in a time domain. A time-offset estimation is calculated and applied to the channel in the time domain to obtain a time-offset compensated channel. The time-offset compensated channel in the time domain is vectorized to obtain a vector of the time-offset compensated channel in the time domain. The vector is correlated to obtain a spatial-time correlation.

In a further embodiment, the present technology relates to a non-transitory computer-readable medium storing computer instructions, that when executed by one or more processors, cause the one or more processors to perform steps. The steps include receiving a plurality of subcarrier signals in an OFDM signal at a plurality of time intervals transmitted by a user equipment from a plurality of antennas at a base station in a cellular network. A channel in a frequency domain is calculated in response to the plurality of subcarrier signals and a frequency-offset estimation as well as a time-offset estimation is calculated. The frequency-offset estimation and time-offset estimation is applied to the channel in the frequency domain to obtain a time-frequencyoffset compensated channel in the frequency domain. The time-frequency-offset compensated channel in a time domain is vectorized to obtain a vector of the time-frequency-offset compensated channel in the time domain. The vector is correlated to obtain a spatial-frequency correlation.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2 illustrates power angle delay profiles according to embodiments of the present technology.

FIG. 3B illustrates a time-offset estimation according to embodiments of the present technology.

FIG. 3C illustrates a frequency-offset estimation according to embodiments of the present technology.

FIGS. 3D-E illustrates a relationship between power angle delay profiles and frequency correlations according to embodiments of the present technology.

FIG. 4A is a block diagram that illustrates obtaining spatial-time correlations according to embodiments of the present technology.

FIG. 4B illustrates the relationship between the PADP and spatial-time correlations as well as radio environment representations with spatial-time correlations of the channel state information according to embodiments of the present technology.

Corresponding numerals and symbols in the different figures generally refer to corresponding parts unless otherwise indicated. Symbols in bold and/or bracketed may represent a set of information and/or matrix of information unless clearly indicated otherwise in the figures and/or detailed description. The figures are drawn to clearly illustrate the relevant aspects of the embodiments and are not necessarily drawn to scale.

DETAILED DESCRIPTION

The present technology generally relates to obtaining a high dimensional (HiDi) radio environment (channel) representation, in for example, a cellular network using orthogonal frequency-division multiplexing (OFDM) signals. By accurately knowing a radio environment representation, base station performance may be improved. For example, base station applications, such as user handover, radio resource management, link adaption, filter and channel estimation, may use geographical location specific HiDi radio environment representations to improve management and communication performance.

In particular, power angle delay profiles (PADPs) for particular geographical locations in a cell of a cellular network may be obtained and stored in a database that may be accessible by base station applications. Similarly, spatial-time (ST) and spatial-frequency (SF) correlations of channel impulse responses may be used to obtain location specific HiDi radio environment representation. Power values may be obtained for specific geographical locations by the correlations and stored in a database accessible by base station applications. HiDi radio environment representations capture both spatial domain and time domain channel characteristics by taking advantage of complexness of the real life channel.

In an embodiment, when using a SF correlation based representation of a radio environment, localization performance may have an above approximate 90% detection accuracy with several antennas and frequency channel samples.

It is understood that the present technology may be embodied in many different forms and should not be construed as being limited to the embodiments set forth herein. Rather, these embodiments are provided so that this disclosure will be thoroughly and completely understood. Indeed, the disclosure is intended to cover alternatives, modifications and equivalents of these embodiments, which are included within the scope and spirit of the disclosure as defined by the appended claims. Furthermore, in the following detailed description, numerous specific details are set forth in order to provide a thorough understanding of the technology. However, it will be clear that the technology may be practiced without such specific details.

Figure 1:
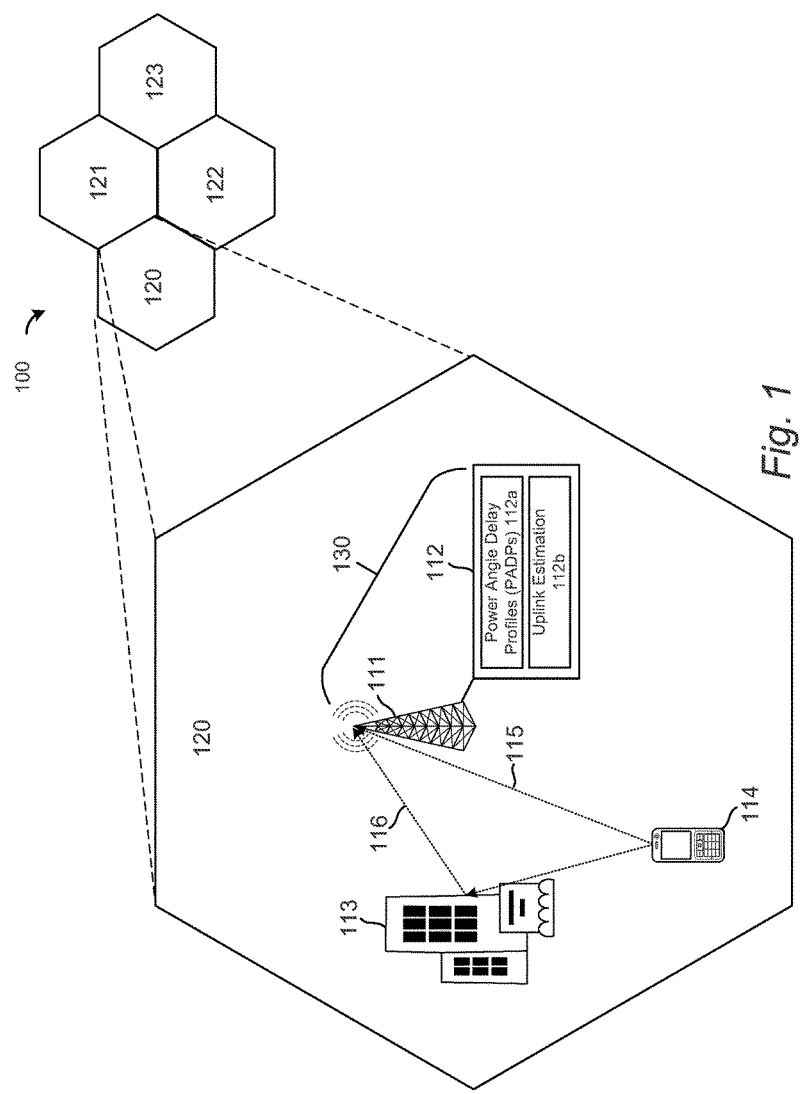
FIG. 1 illustrates a cellular network having multiple cells according to embodiments of the present technology.

FIG. 1 illustrates a system including a cellular network 100 having a plurality of cells 120-123 forming a wireless network according to embodiments of the present technology. FIG. 1 also illustrates an expanded view of cell 120 having a base station 130 that communicates with one or more UEs, such as UE 114, in cell 120. A base station 130 may include antenna 111 coupled to computing device 112 in an embodiment. Antenna 111 may include a plurality of directional antennas or antenna elements and may be coupled to an antenna tower or other physical structure in embodiments. Antenna 111 may transmit and receive signals, such as OFDM signals, to and from UEs in cell 120 in response to electronic signals from and to computing device 112. In an embodiment, antenna 111 includes a multi-input and multi-output (MIMO) antenna. In embodiments, base station 130 includes one or more transceivers coupled to antenna 111 to transmit and receive RF signals to and from UE 114 in cell 120. Computing device 112 may be electronically coupled to other antennas and/or other cells, such as antennas in cells 121-123, in alternate embodiments.

Cell 120 may cover a very different radio environment than one or more cells 121-123. For example, cell 120 may cover a large urban area with many large and irregular spaced structures, such as buildings 113; while, one or more cells 121-123 may cover rural areas that may include a relatively flat topography with very few high structures. Because of the relatively complex radio environment of cell 120, signals transmitted by UE 114 in cell 120 may reflect or form a multipath in arriving at antenna 111. For example, a signal transmitted by UE 114 at a particular geographical location may result in multiple signals arriving at antenna 111 at different times and angles, or rays. A signal transmitted from UE 114 may arrive at antenna 111 as at least two different signals 115 and 116 with different angles of arrival and relative delays. Signal 116 may arrive at antenna 111 as a reflected and delayed signal from buildings 113.

According to embodiments of the present technology, computing device 112 along with at least PADP 112a and uplink estimation 112b software components, as described in detail herein, obtain a HiDi radio environment representation of cell 120. In an embodiment, computing device 112 executes uplink estimation 112b to obtain and store PADPs and/or average power values in PADP 112a. PADPs and/or average power values for UEs transmitting from particular geographical locations in cell 120 may be stored in a database by uplink estimation 112b. HiDi radio environment representations may also be obtained by spatial-time and spatial-frequency correlations of channel impulse responses that may or may not include a power value as described in detail herein. A stored HiDi radio environment representation of cell 120 may be accessed by base station applications executed by computing device 112 in order to improve performance of base station 130. For example, stored HiDi radio representations for particular geographical locations in cell 120 may be accessed and used by base station 130 to improve user handover, radio resource management, link adaption, filtering and channel estimation.

In embodiments, a UE 114 is also known as mobile station (MS). In an embodiment, UE 114 conforms to a SIMalliance, Device Implementation Guide, June 2013 (SIMalliance) specification. In other embodiments, UE 1114 does not conform to the SIMalliance specification.

In embodiments, base station 130 may be second generation (2G), third generation (3G), fourth generation (4G) and/or fifth generation (5G) base station. In embodiments, different types of cellular technologies may be used, such as Global System for Mobile Communications (GSM), code division multiple access (CDMA), Time division multiple access (TDMA) and Advanced Mobile Phone System (AMPS) (analog). In embodiments, different types of digital cellular technologies may be used, such as: GSM, General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

In embodiments, base station 130 may be an E-UTRAN Node B (eNodeB), Node B and/or Base Transceiver Station (GBTS) BS. A GBTS may operate a variety of type's wireless technology, such as CDMA, GSM, Worldwide Interoperability for Microwave Access (WiMAX) or Wi-Fi. A GBTS may include equipment for the encryption and decryption of communications, spectrum filtering equipment, antennas and transceivers. A GBTS typically has multiple transceivers that allow it to serve many of the cell's different frequencies and sectors.

FIG. 2 illustrates a PADP according to embodiments of the present technology. A radio channel from a particular location in a cell that a UE may transmit to a base station is represented by a power value, vertical angle of arrival, horizontal angle of arrival and delay value as illustrated by equation 201. FIG. 2 illustrates an orientation 200 of an antenna 204 (or an array of antenna elements) with respect to a received signal or ray 206 from UE 205 having a horizontal angle of arrival $\Phi$, a vertical angle of arrival of $\theta$ and delay value $\tau_s$. A delay value may be relative to a first channel tap arrived at the base station as illustrated by equation 202. In embodiments, transmit power at different locations are normalized to the unit and $\tau_1=\min \tau_s$. In an embodiment, antenna 204 and UE 205 correspond to antenna 111 and UE 114 in FIG. 1.

Figure 3A:
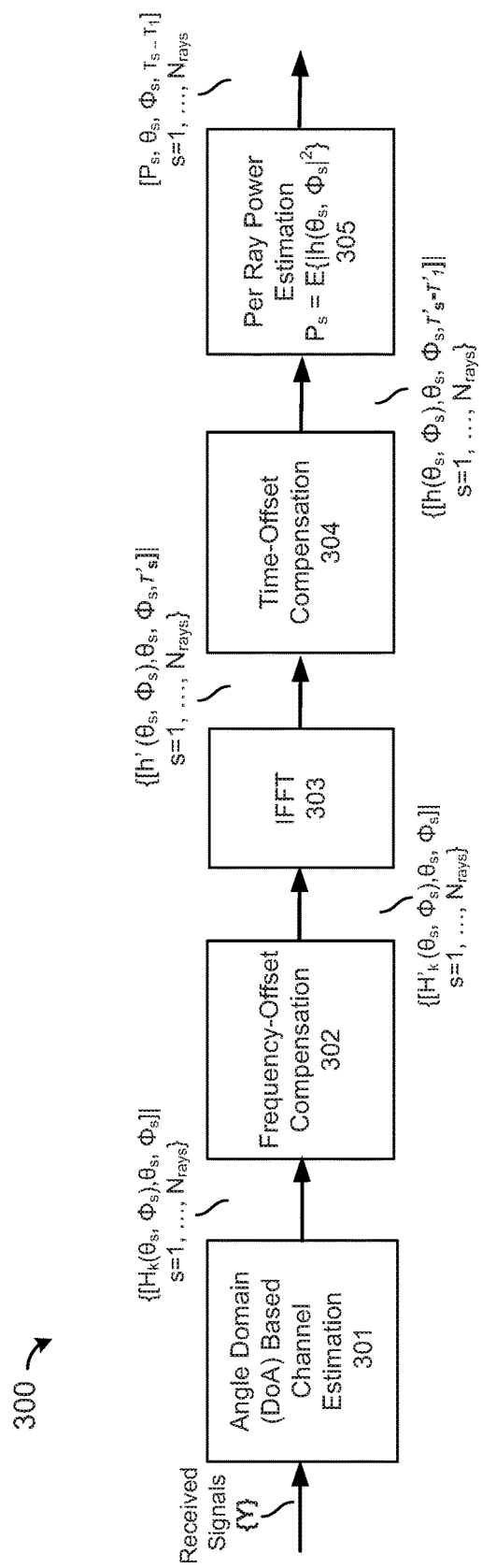
FIG. 3A is a block diagram that illustrates obtaining power angle delay profiles according to embodiments of the present technology.

FIG. 3A is a block diagram 300 that illustrates obtaining power angle delay profiles for particular geographical locations in a cell according to embodiments of the present technology. In an embodiment, a plurality of received signals $\{Y\}$ are input to angle domain (DOA) based channel estimation 301. In an embodiment, the plurality of signals $\{Y\}$ are obtained from one or more antennas (or antenna elements) that receives an OFDM signal from one or more UEs.

In embodiments, a plurality of received signals $\{Y\}$ include a received signal set $\{y_{mk}\}$ over multiple time instances, where $y_{mk}$ is a received signal at the m-th antenna, k-th subcarrier. In an embodiment, DOA based channel estimation 301 outputs complex channel values for a horizontal angle of arrival and vertical angle of arrival per ray in a plurality of rays received—$\{[H_k(\theta_s,\phi_s), \theta_s, \phi_s]|s=1, \ldots N_{rays}\}$. In an embodiment, DOA based channel estimation 301 outputs an estimated channel state in the frequency domain.

In an embodiment, DOA based channel estimation 301 is calculated by using an array signal processing method include one of N-point discrete fourier transform (DFT) steering, minimum variance distortionless response (MVDR) and multiple signal classification (MUSIC). In an embodiment, DOA based channel estimation 301 calculates a channel estimation before receiving signals.

Frequency-offset compensation 302 applies a frequency-offset compensation (or estimations) to the complex channel values input from DOA based channel estimation 301. In an embodiment, a frequency-offset compensation is applied as illustrated in frequency-offset estimation equations 375 in FIG. 3C, and in particular a frequency-offset estimation is applied using equation 380. Frequency-offset compensation 302 outputs frequency compensated complex channel values $\{[H'_k(\theta_s,\phi_s), \theta_s, \phi_s]|s=1, \ldots N_{rays}\}$ to inverse fast fourier transform (IFFT) 303.

IFFT 303 performs an inverse fast fourier transform on frequency compensated complex channel values $\{[H'_k(\theta_s, \phi_s), \theta_s, \phi_s]|s=1, \ldots N_{rays}\}$ to output an estimated channel state in the time domain $\{[h'_k(\theta_s,\phi_s), \theta_s, \phi_s, \tau'_s]|s=1, \ldots N_{rays}\}$ that is input to time-offset compensation 304.

Time-offset compensation 304 provides a time-offset compensation to an estimated channel state in the time domain $\{[h'_k(\theta_s,\phi_s), \theta_s, \phi_s, \tau'_s]|s=1, \ldots N_{rays}\}$. In an embodiment, a time-offset estimation is first applied as illustrated in time-offset estimation equations 350 in FIG. 3B, and in particular a time-offset estimation is applied using equation 356. Time-offset compensation 304 outputs time-offset compensated channel values $[h(\theta_s,\phi_s), \theta_s, \phi_s, \tau'_s-\tau'_1]$ $|s=1, \ldots N_{rays}\}$ to per ray power estimation 305.

Per ray power estimation 305 obtains an expected value or averages timing compensated channel values in the time domain $h(\theta_s,\phi_s)$ to obtain an average power value $P_s$ for horizontal angle of arrival, vertical angle of arrival and time delay for the plurality of rays. The average power value $P_s$ and associated geographical location of the transmitting UE may then be stored in a database that is accessible by a base station application.

FIG. 3B illustrates time-offset estimation equations 350 according to embodiments of the present technology. In embodiments, time-offset compensation 304, time-offset compensation 404 and time-frequency-offset compensation 502 shown in FIGS. 3A, 4A and 5A perform at least a portion of equations 350 illustrated in FIG. 3B. Similarly, in software component embodiment's time-offset compensation 901d and 902d as well as time-frequency-offset compensations 903b perform at least a portion of the equations 350 of FIG. 3B.

Equation 351 illustrates an angle channel in the time domain where each component is frequency flat in an embodiment.

Equation 352 illustrates a frequency domain channel in an embodiment.

Equation 353 illustrates a frequency channel correlation in an embodiment.

Equation 354 illustrates a time-offset to obtain angular phase in an embodiment.

Equation 355 illustrates an average correlation on the estimated frequency domain channel in embodiment.

Equation 356 illustrates a time-offset estimation that may be used in embodiments.

FIG. 3C illustrates frequency-offset estimation equations 375 according to embodiments of the present technology. In embodiments, frequency-offset compensation 302, frequency-offset compensation 402 and time-frequency-offset compensation 502 shown in FIGS. 3A, 4A and 5A perform at least a portion of equations 375 illustrated in FIG. 3C. Similarly, in software component embodiment's frequency-offset compensation 901b and 902b as well as time-frequency-offset compensations 903b perform at least a portion of the equations 375 in FIG. 3C.

Equation 376 illustrates a frequency domain channel with a frequency offset in an embodiment.

Equation 377 illustrates frequency domain channel correlation of different OFDM symbols and assumes that a channel does not change of time (/'-/ is small) in an embodiment.

Equation 378 illustrates a frequency-offset to obtain an angular phase in an embodiment.

Equation 379 illustrates an average correlation on the estimated frequency domain channel in an embodiment.

Equation 380 illustrates a frequency-offset estimation that may be used in embodiments. A frequency-offset estimation is assumed to be the same for different rays in an embodiment. In an embodiment, frequency-offset estimations for different rays may be averaged to improve performance.

When frequency-offset estimations are different over rays, per-ray-frequency-offset estimations may be performed similarly in an embodiment.

FIGS. 3D-E illustrates a relationship between power delay profiles and frequency correlations according to embodiments of the present technology. In particular, FIG. 3D illustrates power delay profiles for extended pedestrian A (EPA), Extended Vehicle A (EVA) and Extended Typical Urban (ETU) models. In each model, power values of signals are charted at particular delay values.

FIG. 3E illustrates frequency domain correlation versus subcarrier step or spacing in an OFDM signal for each model. In an embodiment, subcarrier spacing $\Delta n_f$ is the same as subcarrier spacing $\Delta k$ as seen in equation 590 of FIG. 5D. In comparing FIGS. 3D and 3E, frequency domain correlation captures power delay profiles to a certain extent.

FIG. 4A is a block diagram 400 that illustrates obtaining spatial-time correlations for UEs transmitting at particular geographical locations in a cell according to embodiments of the present technology. In an embodiment, a plurality of received signals are input to frequency domain channel estimation 401. In embodiments, a plurality of received signals $\{Y\}$ include a received signal set $\{y_{mk}\}$ over multiple time instances, where $y_{mk}$ is a received signal at the m-th antenna, k-th subcarrier as described similarly herein. In an embodiment, frequency domain channel estimation 401 outputs an estimated channel state in the frequency domain $\{H\}$ to frequency-offset compensation 402 in response to the received signals $\{Y\}$.

Frequency-offset compensation 402 provides a frequency-offset estimation to an estimated channel state in the frequency domain $\{H\}$ and then compensates the frequency-offset on the estimated channel. In an embodiment, a frequency-offset estimation is applied as illustrated in frequency-offset estimation equations 375 of FIG. 3C, and in particular a frequency-offset estimation is applied using equation 380. Frequency-offset compensation 402 outputs frequency-offset compensated estimated channel state in the frequency domain $\{H'\}$ to IFFT 403 in response to receiving an estimated channel state in the frequency domain $\{H\}$.

IFFT 403 performs an inverse fast fourier transform on a received frequency-offset compensated estimated channel state in the frequency domain $\{H'\}$ to output an estimated channel state in the time domain $\{h'\}$ that is then input to time-offset compensation 404.

Time-offset compensation 404 provides a time-offset estimation to an estimated channel state in the time domain $\{h'\}$. In an embodiment, a time-offset compensation is applied as illustrated in time-offset estimation equations 350 of FIG. 3B, and in particular a time-offset estimation is applied using equation 356. Time-offset compensation 404 outputs a time-offset compensated channel state in the time domain $\{h\}$ to spatial-temporal vectorization 902e in response to receiving an estimated channel state in the time domain $\{h'\}$.

Spatial-temporal vectorization 406 outputs a vector $\{vec(h)\}$ or vectorizes a received time-offset compensated channel state in the time domain $\{h\}$. In an embodiment, vec(h)= $[h_{11}, \ldots, h_{1NTs}, h_{21}, \ldots, h_{2NTs}, h_{mn}, \ldots, h_{M1}, \ldots, h_{MNTs}]^T$ where NTs (or NTs) equals the number of time domain channel sampling points for ST correlation estimations. In an embodiment, spatial-temporal vectorization 406 outputs a vector $\{vec(h)\}$ to spatial-temporal channel impulse response (CIR) correlation 407 in response to receiving a time-compensated channel state in the time domain $\{h\}$.

Spatial-temporal CIR correlation 407 outputs a spatial-time correlation $R_{ST}$ in response to receiving a vector $\{vec(h)\}$. In an embodiment, a spatial-time correlation $R_{ST}$ may be estimated at $R_{ST}=E\{vec(h)*vech(h)^H\}$. In an embodiment, an average power value estimation P for a UE transmitting from a particular geographical location may be obtained by an Eigen decomposition of the spatial-time correlation $R_{ST}$ as illustrated in FIG. 4B.

FIG. 4B illustrates represents the relationship between PADPs and spatial-time correlations as well as radio environment representations with spatial-time correlations of the channel state information according to embodiments of the present technology. In particular, FIG. 4B illustrates equation 450 that represents the relationship between spatial-time correlations $R_{mn,n'n}$ (or $R_{ST}$) and PADPs. For example, equation portion 450a represents data sampling of the system and equation portion 450b represents the relation with PADPs. Equation portion 450b illustrates that delay values relative to the first tap and angles are encapsulated in the final result shown as equation portion 450c that includes a set of power values $P_s$ (or P) for a particular geographical location. In an embodiment, small scale fading for each ray component is independent. Eigen decomposition of spatial-time correlation $R_{ST}$ is illustrated by equation 451 with a radio environment representation in equation 452. A set of P values in equation 452 may be averaged to obtain average power value P for a UE transmitting from particular geographical location.

Figures 4C, 4D:
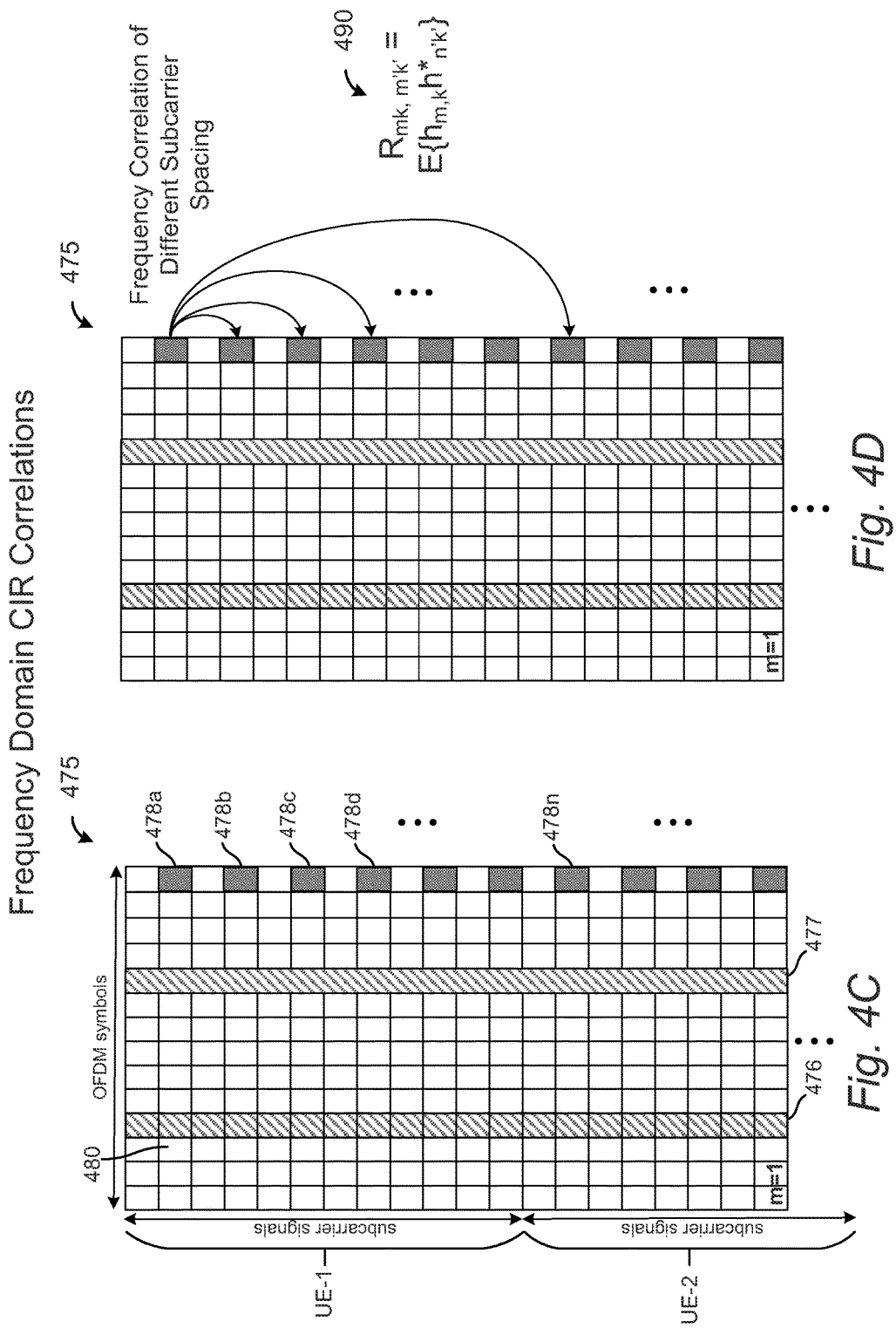
FIGS. 4C-D illustrates frequency correlation using different subcarrier spacing according to embodiments of the present technology.

FIGS. 4C-D illustrates frequency correlation using different subcarrier spacing according to embodiments of the present technology. In particular, FIGS. 4C-D illustrate a resource grid 475 having a plurality of resource elements that represent received OFDM symbols from a plurality of subcarrier signals in an OFDM signal at an antenna from a UE, such as UE-1. In an embodiment, UE-1 correspond to UE 114 shown in FIG. 1 and UE-2 represents a different UE transmitting to antenna 111 in cell 120. In an embodiment, resource grid 475 represents resource elements from a single antenna (m=1) or antenna element, such as antenna 111 shown in FIG. 1. In alternate embodiments, a resource grid may represent a plurality of resource elements from a plurality of antennas or antenna elements.

For example, resource grid 475 includes a plurality of rectangles or resource elements, such as resource element 480 that may represent a time interval (time slot or OFDM symbol period) to sample or obtain a signal value from an OFDM signal (in some embodiments a resource element may not be used). In an embodiment, a plurality of resource elements may be grouped in a block to form a resource block. Columns of resource grid 475 may represent a plurality of resource elements at a particular time interval and rows may represent subcarrier signals that have frequencies separated by a OFDM subcarrier frequency space (or spacing). For example, the first row of resource grid 475 may represent 14 OFDM symbols of a first subcarrier signal having a frequency in an OFDM signal; while the second row represents 14 OFDM symbols of a second subcarrier signal in an OFDM signal having a frequency off+$\Delta f$ (or spacing). A particular subcarrier signal in a plurality of subcarrier signals may be identified with an index (or number) or subcarrier index. Similarly, a particular OFDM symbol in a plurality of OFDM symbols may be identified by another index (or another number) or OFDM symbol index.

Resource elements may include OFDM symbols that may represent data and/or control signals in embodiments. In other embodiments, resource elements may not be used or used for reference signals. For example, resource elements 478a-n include wide band sound reference signals (SRSs) and columns of resource elements 476 and 477 include demodulation reference signals (DMRSs or DM-RSs) in embodiments.

As described in detail herein, FIG. 4D illustrates obtaining frequency domain CIR correlations for particular geographical locations by using different subcarrier signal spacing. In particular, equation 490 describes obtain correlations using different subcarrier frequency spacing (m-th antenna, k-th subcarrier) shown in FIG. 4D.

Figure 5A:
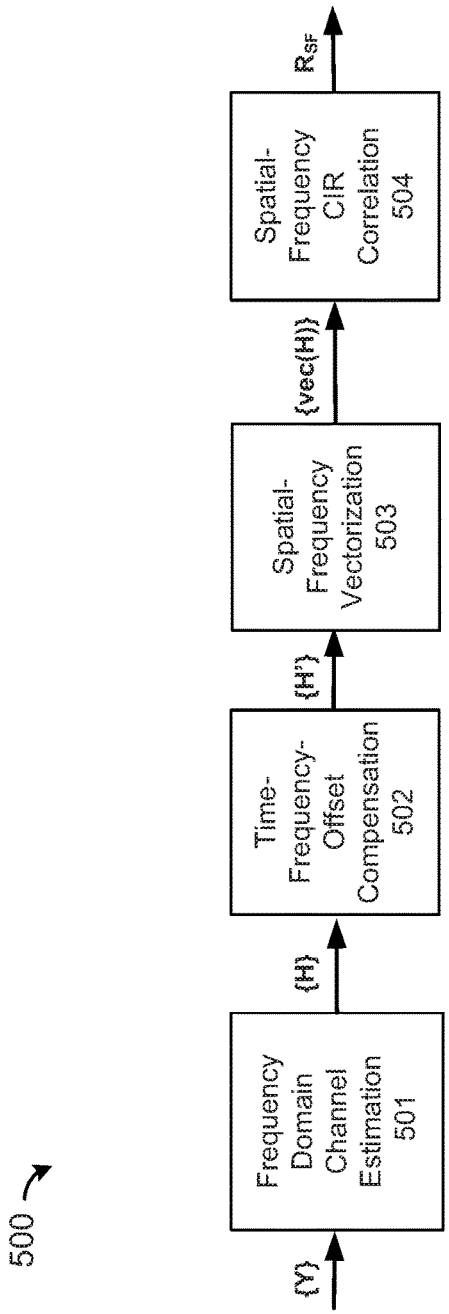
FIG. 5A is a block diagram that illustrates obtaining spatial-frequency correlations according to embodiments of the present technology.
Figure 5B:
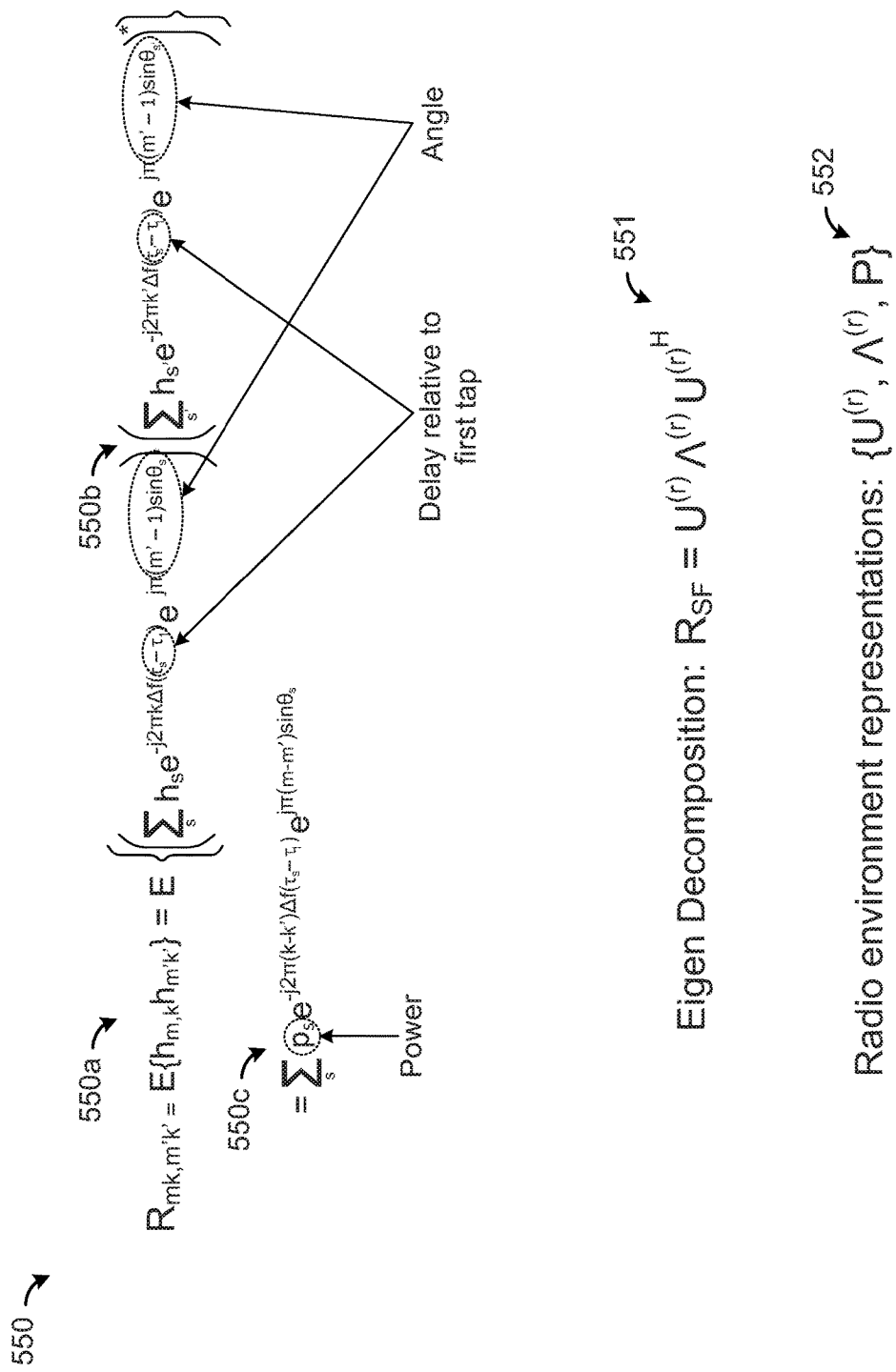
FIG. 5B illustrates the relationship between the PADP and spatial-frequency correlations as well as radio environment representations with spatial-frequency correlations of the channel state information according to embodiments of the present technology.
Figure 5C:
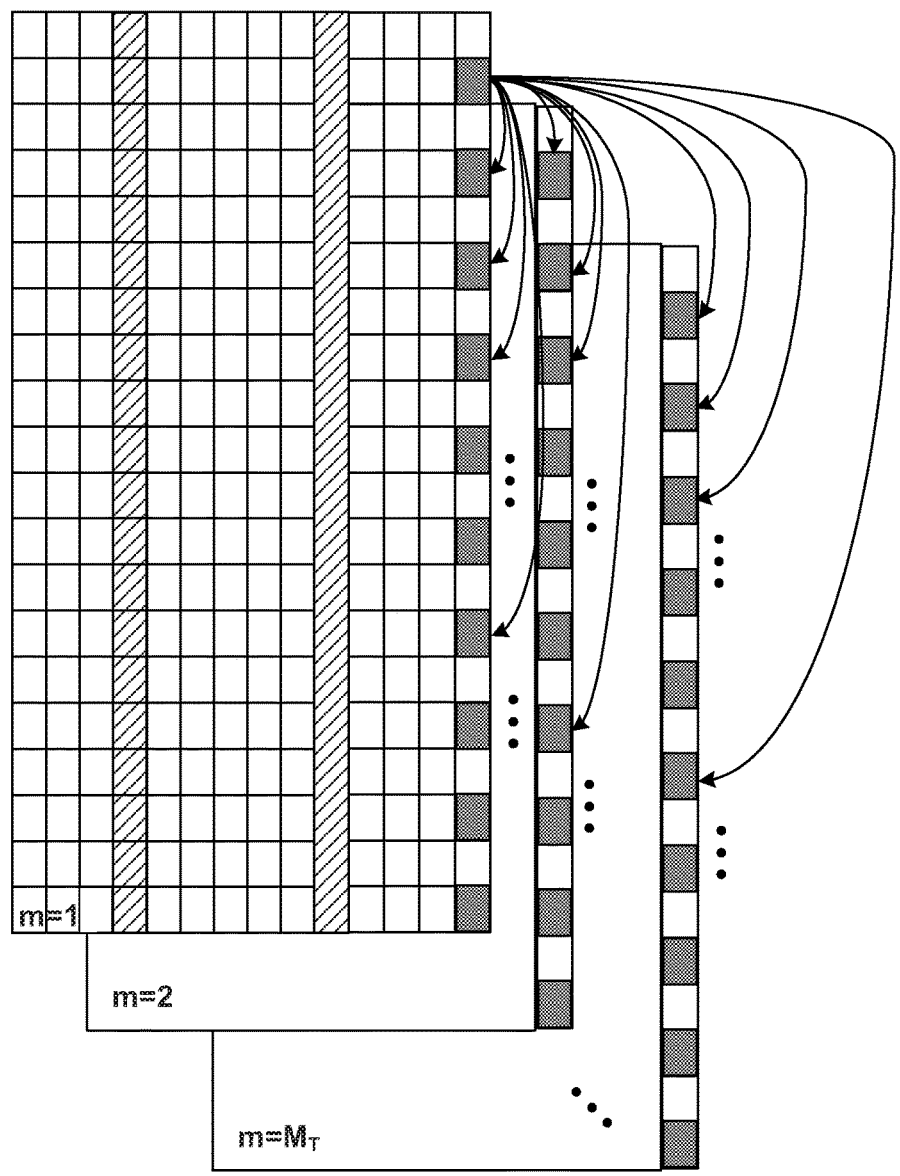
FIG. 5C illustrates spatial-frequency correlation using different antenna elements according to embodiments of the present technology.
Figure 5D:
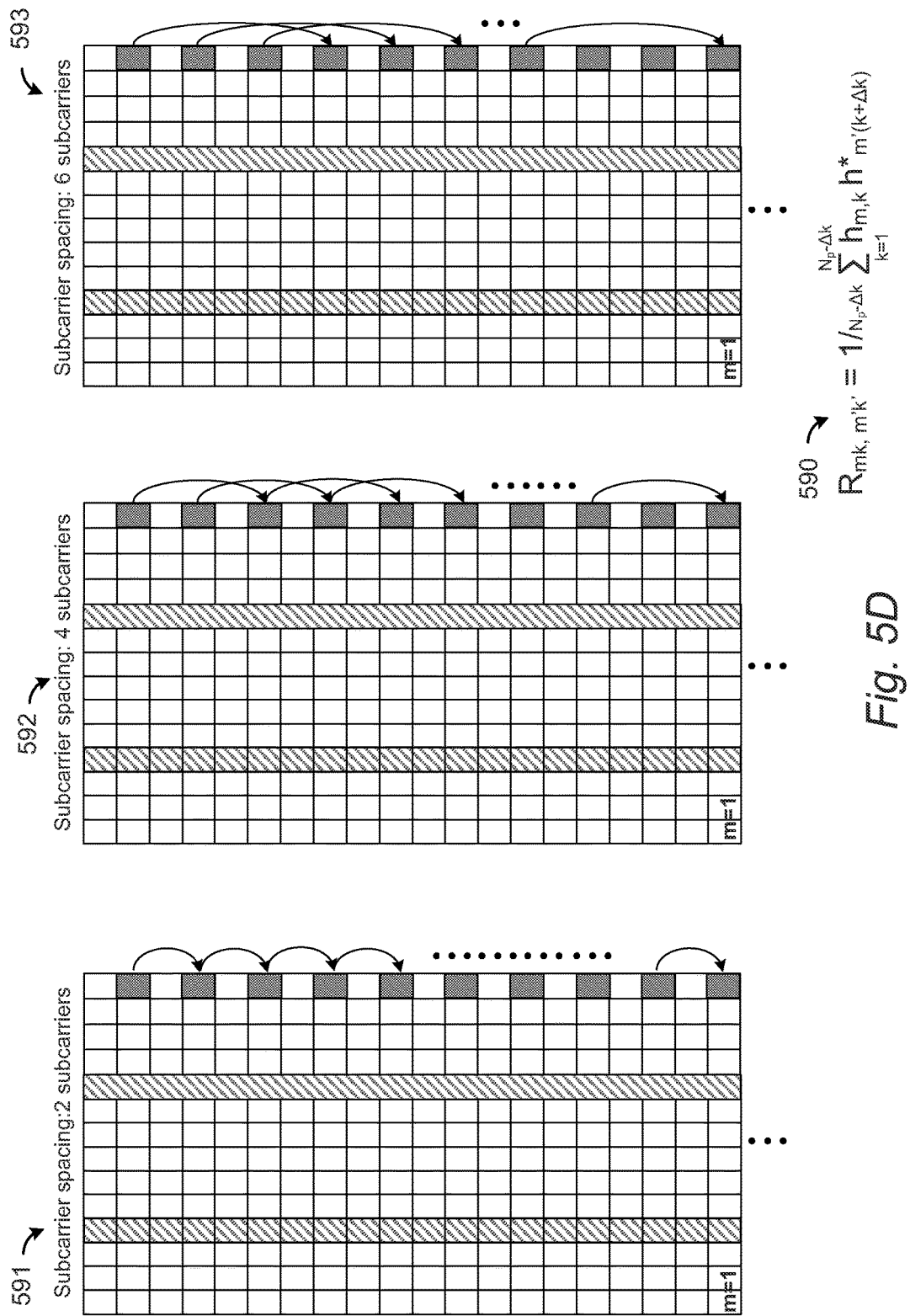
FIG. 5D illustrates frequency correlation using different subcarrier spacing and wideband averaging according to embodiments of the present technology.

FIG. 5D and equation 590, as described below, also illustrates obtaining an average correlation based on different subcarrier spacing $\Delta k$.

FIG. 5A is a block diagram 500 that illustrates obtaining spatial-time correlations for UEs transmitting at particular geographical locations in a cell according to embodiments of the present technology. In an embodiment, a plurality of received signals are input to frequency domain channel estimation 501. In embodiments, a plurality of received signals $\{Y\}$ include a received signal set $\{y_{mk}\}$ over multiple time instances, where $y_{mk}$ is a received signal at the m-th antenna, k-th subcarrier as described similarly herein. In an embodiment, frequency domain channel estimation 501 outputs an estimated channel state in the frequency domain $\{H\}$ to time-frequency-offset compensation 502 in response to the received signals $\{Y\}$.

Time-frequency-offset compensation 502 provides a time and frequency-offset estimation and compensates the estimated time and frequency offsets to an estimated channel state in the frequency domain $\{H\}$. In an embodiment, a time-frequency-offset estimation is applied as illustrated in time-offset estimation equations 350 and frequency-offset estimation equations 375 shown in FIGS. 3B-C. In embodiments, a time-offset estimation and frequency-offset estimation is applied using equations 356 and 380 in FIGS. 3B-C. Time-frequency-offset compensation 502 outputs time-frequency offset compensated estimated channel state in the frequency domain $\{H'\}$ to spatial-frequency vectorization 503.

Spatial-frequency vectorization 503 outputs a vector $\{vec(H)\}$ or vectorizes a received time-frequency offset compensated channel state in the frequency domain $\{H\}$. In an embodiment, $vec(H)=[H'_{11}, \ldots, H'_{1N_{Fs}}, H'_{21}, \ldots, H'_{2N_{Fs}}, \ldots, H'_{mk}, \ldots, H_{M1}, \ldots, h_{MN_{Fs}}]^T$ where NFs (or $N_{FS}$) equals the number of frequency domain channel sampling points for SF correlation estimations. In an embodiment, spatial-frequency vectorization 503 outputs a vector $\{vec(H)\}$ to spatial-frequency CIR correlation 504 in response to receiving a frequency-time-compensated channel state in the frequency domain $\{H'\}$.

Spatial-frequency CIR correlation 504 outputs a spatial-frequency correlation $R_{SF}$ in response to receiving a vector $\{vec(H)\}$. In an embodiment, a spatial-frequency correlation $R_{SF}$ may be estimated at $R_{SF}=E\{vec(H) vech(H)^H\}$. In an embodiment, an average power value estimation P for a UE transmitting from a particular geographical location may be obtained by an Eigen decomposition of the spatial-frequency correlation $R_{SF}$ as illustrated in FIG. 5B.

FIG. 5B illustrates the relationship between the PADP and spatial-frequency correlations as well as radio environment representations with spatial-frequency correlations of the channel state information according to embodiments of the present technology. In particular, FIG. 5B illustrates equation 550 that represent the relationship between spatial-frequency correlations $R_{mk,m'k'}$ (or $R_{SF}$) and PADPs. For example, equation portion 550a represents data sampling of the system and equation portion 550b represents the relation with PADPs. Equation portion 550b illustrates that delay values relative to the first tap and angles are encapsulated in the final result shown as equation portion 550c that includes a set of power values $P_s$ (or P) for a particular geographical location. As shown in FIG. 5B, equation 550c depends on Δk=k−k' and not an arbitrary subcarrier location in an embodiment. Eigen decomposition of spatial-frequency correlation $R_{SF}$ is illustrated by equation 551 with a radio environment representation in equation 552. A set of P values in equation 552 may be averaged to obtain average power value for a particular geographical location.

FIG. 5C illustrates spatial-frequency correlation of signals received from different antennas according to embodiments of the present technology. In particular, FIG. 5C illustrates spatial-frequency CIR correlations 575 between different received subcarrier signals of an OFDM signal at different resource elements or time intervals at different antennas, such as antennas m=1, m=2 . . . m=MT. In an embodiment, spatial-frequency correlations are performed using a plurality of subcarriers signals received at a plurality antennas, such as sound reference signal (SRS) signals in subcarriers signals at different subcarrier spacing in an OFDM signal. In an embodiment, FIG. 5C illustrates the spatial-frequency correlation performed by spatial-frequency correlation 504 shown in 5A and/or correlation 903d shown in FIG. 10.

FIG. 5D illustrates frequency correlation using different subcarrier spacing for a particular antenna according to embodiments of the present technology. 501 illustrate frequency correlation between subcarriers signals having a spacing of 2 subcarriers for a particular antenna, such as m=1.592 illustrates frequency correlation between subcarriers signals having a spacing of 4 subcarriers for a particular antenna, such as m=1.593 illustrates frequency correlation between subcarrier signals having a spacing of 6 subcarriers for a particular antenna, such as m=1. Equation 590 describes obtaining an average correlation by averaging the correlations over different subcarrier spacing for a particular antenna, such as m=1.

FIGS. 6, 7A-B and 8 are flowcharts that illustrate methods according to embodiments of the present technology. In embodiments, flowcharts in FIGS. 6, 7A-B and 8 are computer-implemented methods performed, at least partly, by hardware and software components illustrated in FIGS. 1 and 9-10 and as described herein. In an embodiment, software components in FIG. 10, executed by one or more processors, such as processor 910 shown in FIG. 9, perform at least a portion of the methods.

Figure 6:
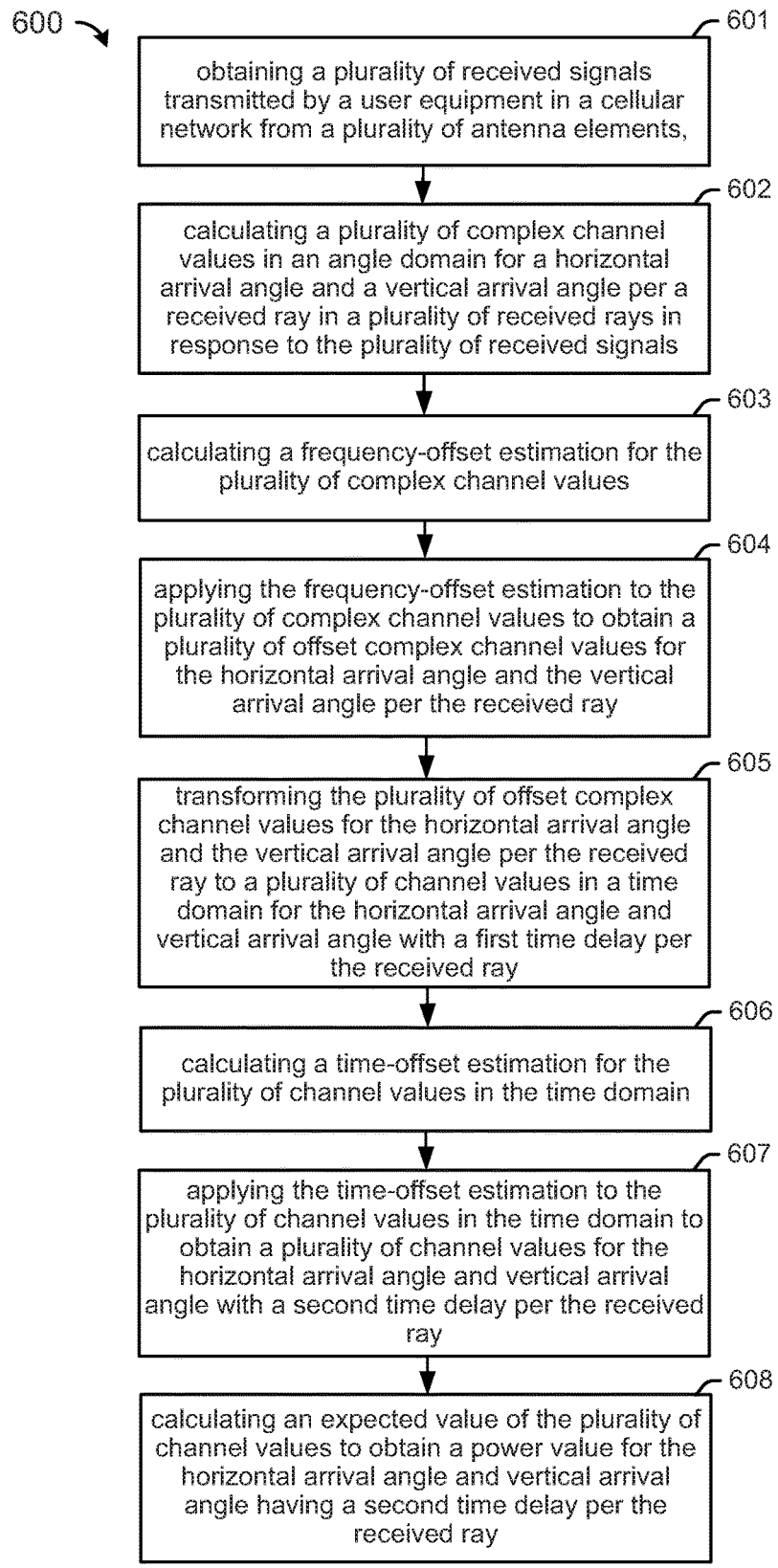
FIG. 6 is a flowchart that illustrates a method for obtaining a power angle delay profile according to embodiments of the present technology.

FIG. 6 is a flowchart that illustrates a method 600 for obtaining PADPs according to embodiments of the present technology. In FIG. 6 at 601, a plurality of received signals transmitted by a user equipment from a plurality of antenna elements in a cellular network is obtained. In an embodiment, receive 904 executed by processor 910 performs at least a portion of this function as described herein and illustrated in FIG. 9.

At 602 a plurality of complex channel values in an angle domain are calculated for a horizontal arrival angle and a vertical arrival angle per a received ray in a plurality of received rays in response to the plurality of received signals. In an embodiment, UL estimation 901 executed by processor 910 performs at least a portion of this function as described herein and illustrated in FIGS. 9-10. In an embodiment, UL estimation 901 executed by processor 910 performs at least portions of the following functions described in method 600.

Figure 10:
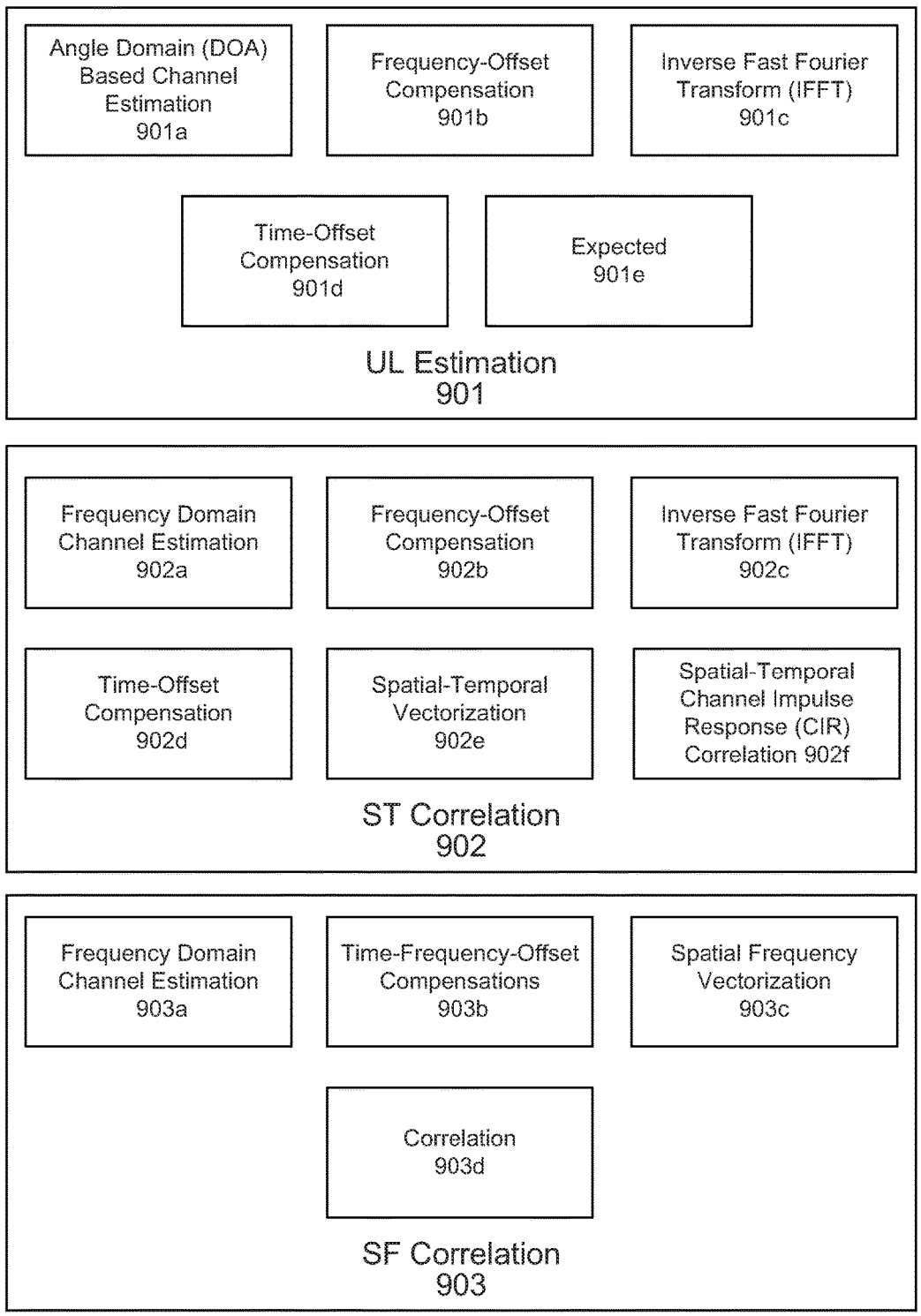
FIG. 10 is a block diagram that illustrates a software architecture according to embodiments of the present technology.

At 603 a frequency-offset estimation for the plurality of complex channel values is calculated. In an embodiment, frequency-offset compensation 901b of UL estimation 901 as shown in FIG. 10 is used.

At 604 the frequency-offset estimation for the plurality of complex channel values is applied to obtain a plurality of offset complex channel values for the horizontal arrival angle and the vertical arrival angle per the received ray. In an embodiment, frequency-offset compensation 901b of UL estimation 901 is used.

At 605 the plurality of offset complex channel values for the horizontal arrival angle and the vertical arrival angle per the received ray are transformed to a plurality of channel values in a time domain for the horizontal arrival angle and vertical arrival angle with a first time delay per the received ray. In an embodiment, IFFT 901c of UL estimation 901 is used.

At 606 a time-offset estimation is calculated for the plurality of channel values in the time domain. In an embodiment, time-offset compensation 901d of UL estimation 901 is used.

At 607 the timing-offset estimation is applied to the plurality of channel values in the time domain to obtain a plurality of channel values for the horizontal arrival angle and vertical arrival angle with a second time delay per the received ray. In an embodiment, time-offset compensation 901d of UL estimation 901 is used.

At 608 an expected value of the plurality of channel values is calculated to obtain a power value for the horizontal arrival angle and vertical arrival angle having a second time delay per the received ray. In an embodiment, expected 901e of UL estimation 901 is used.

Figure 7A:
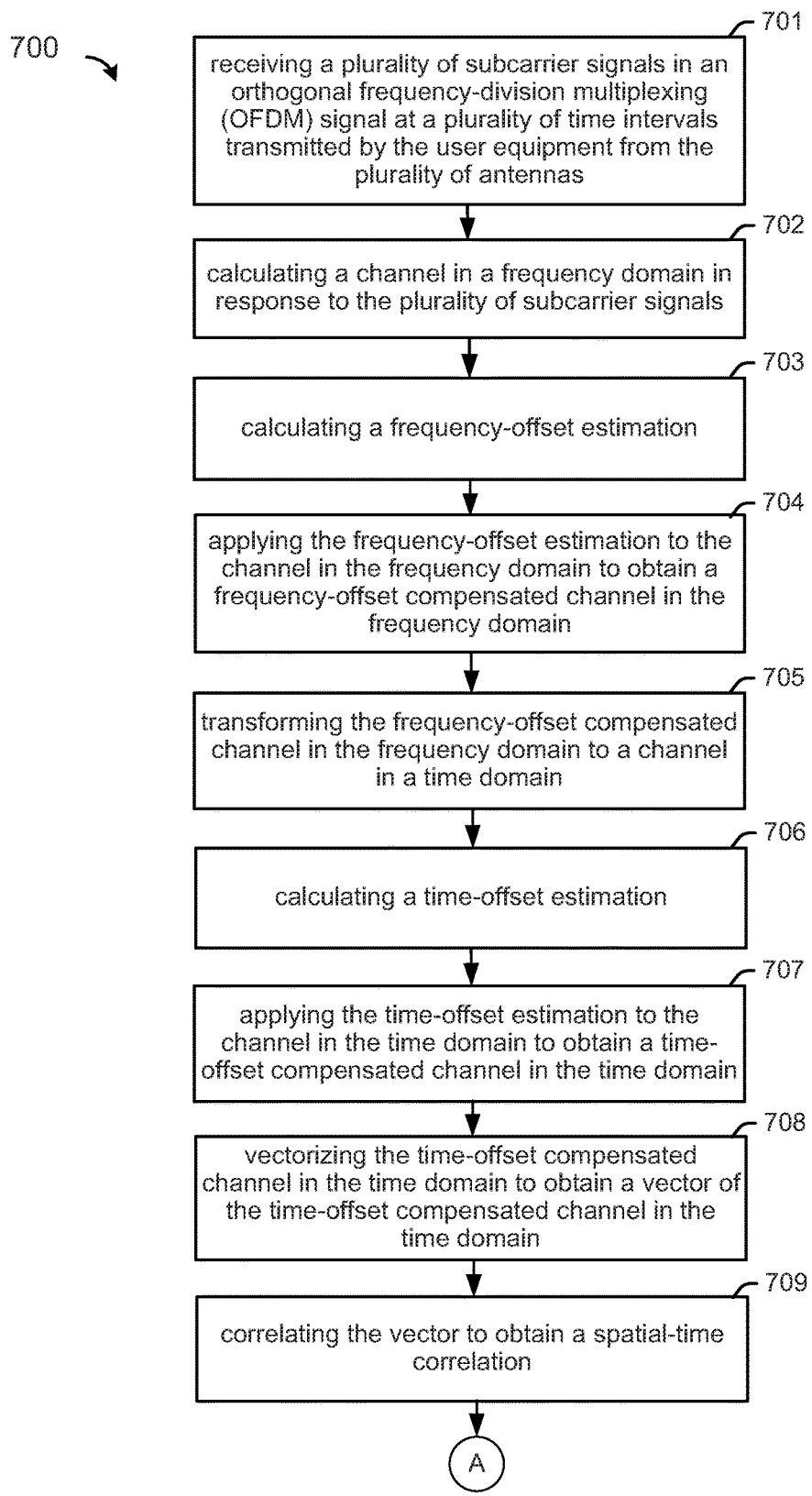
FIGS. 7A-B is a flowchart that illustrates a method for obtaining power estimates by spatial-temporal correlation according to embodiments of the present technology.
Figure 7B:
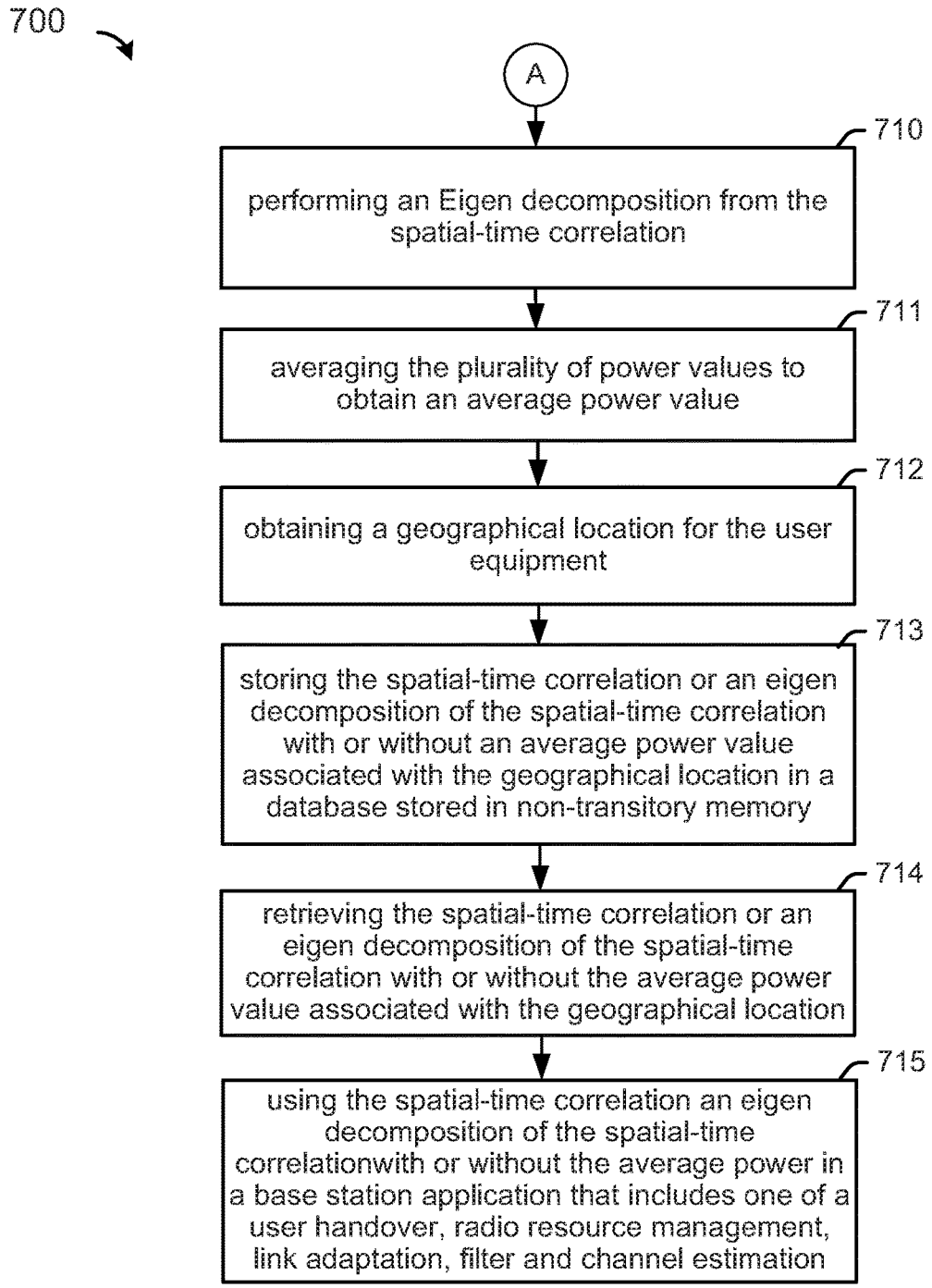

FIGS. 7A-B is a flowchart that illustrates a method 700 for obtaining spatial-temporal correlation according to embodiments of the present technology. In FIG. 7A at 701 a plurality of subcarrier signals in an OFDM signal is received from the plurality of antennas at a plurality of time intervals that are transmitted by a user equipment. In an embodiment, receive 904 executed by processor 910 performs at least a portion of this function as described herein and illustrated in FIG. 9.

At 702 a channel in a frequency domain is calculated in response to the plurality of subcarrier signals. In an embodiment, spatial-time correlation 902 executed by processor 910 performs at least a portion of this function as described herein and illustrated in FIGS. 9-10. In an embodiment, spatial-time correlation 902 executed by processor 910 performs at least portions of the following functions described in method 700.

At 703 a frequency-offset estimation is calculated. In an embodiment, frequency-offset compensation 902b of spatial-time correlation 902 as shown in FIG. 10 is used.

At 704 the frequency-offset estimation is applied to the channel in the frequency domain to obtain a frequency-offset compensated channel in the frequency domain. In an embodiment, frequency-offset compensation 902b of spatial-time correlation 902 is used.

At 705 the frequency-offset compensated channel in the frequency domain is transformed to a channel in a time domain. In an embodiment, IFFT 902c of spatial-time correlation 902 is used.

At 706 a time-offset estimation is calculated. In an embodiment, time-offset compensation 902d of spatial-time correlation 902 is used.

At 707 the time-offset estimation is applied to the channel in the time domain to obtain a time-offset compensated channel in the time domain. In an embodiment, time-offset compensation 902d of spatial-time correlation 902 is used.

At 708 the time-offset compensated channel in the time domain is vectorized to obtain a vector of the time-offset compensated channel in the time domain. In an embodiment, spatial-temporal vectorization 902e of spatial-time correlation 902 is used.

At 709 the vector is correlated to obtain a spatial-time correlation. In an embodiment, spatial-time channel impulse response correlation 902f is used.

At 710 in FIG. 7B, an Eigen decomposition from the spatial-time correlation is performed. In an embodiment, spatial-time channel impulse response correlation 902f is used. In an embodiment, correlating the vector to obtain a spatial-time correlation includes correlating the vector to obtain an Eigen decomposition of the spatial time correlation with or without an average power value.

At 711 a plurality of power values obtained from the spatial-time correlation are averaged to obtain an average power value. In an embodiment, a spatial-time correlation or an Eigen decomposition of the spatial-time correlation is obtained without obtaining or averaging power values. In an embodiment, spatial-time channel impulse response correlation 902f is used.

At 712 a geographical location for the user equipment is obtained. In an embodiment, receive 904 executed by processor 910 performs at least a portion of this function as described herein and illustrated in FIG. 9.

At 713 the spatial-time correlation or Eigen decomposition of the spatial-time correlation, with or without an average power value associated with the geographical location is stored in a database. In an embodiment, receive 904 executed by processor 910 stores spatial-time correlations with or without power values associated geographical locations in a spatial-time correlation database 906 in memory 930.

At 714 the spatial-time correlation or an Eigen decomposition of the spatial-time correlation with or without an average power value associated with the geographical location is retrieved. In an embodiment, base station applications stored in memory 930 executed by processor 910 performs at least a portion of this function. In an embodiment, a spatial-time correlation with or without an average power value and associated geographical location stored in spatial-time correlation database 907 may be accessed by base station applications 906. In embodiments, spatial-time correlations and spatial-frequency correlations with or without an average power value are considered radio channel representations for particular locations in a cell when there are not sufficient antennas or antenna elements to obtain accurate PADPs. [Comment: spatial-time correlation with (or without) average power is considered as the radio channel representation for a location. Why the power value is given a special focus here? Also spatial-time correlation (or Eigen decomposition of spatial time correlation) with or without average power is a channel representation in parallel of PADP or independent PADP. We do not need PADP to form channel representation when we have spatial-time correlation. Actually we consider spatial-time correlation and later spatial-frequency correlation as the channel representation because for current systems or even in 5G we may not be able to get good PADP information as number of antennas is not large enough.]

At 715 the spatial-time correlation or an Eigen decomposition of the spatial-time correlation with or without an average power value is used in a base station application. In an embodiment, base station applications 906 executed by processor 910 performs at least a portion of this function. In embodiments, a base station application in base station applications 906 includes, but is not limited to, functions to perform one of a user handover, radio resource management, link adaptation, filter and channel estimation for a base station communicating with user equipment in a cellular network.

Figure 8:
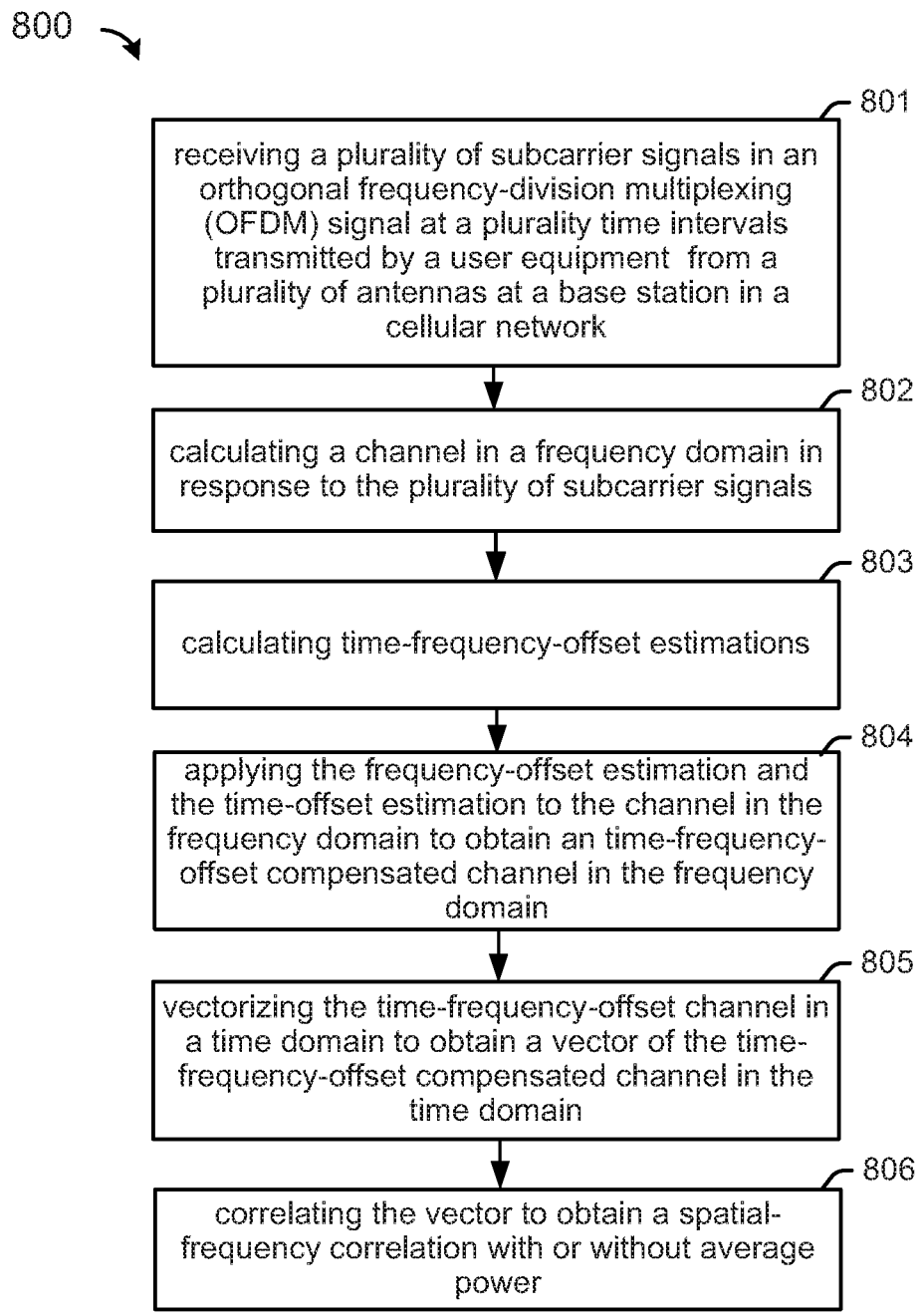
FIG. 8 is a flowchart that illustrates a method for obtaining power estimates using spatial-frequency correlation according to embodiments of the present technology.

FIG. 8 is a flowchart that illustrates a method 800 for obtaining a spatial-frequency correlation according to embodiments of the present technology. In FIG. 8 at 801 a plurality of subcarrier signals in an OFDM signal is received at a plurality time intervals from a plurality of antennas at a base station in a cellular network in which the signals are transmitted by a user equipment. In an embodiment, receive 904 executed by processor 910 performs at least a portion of this function as described herein and illustrated in FIG. 9.

At 802 a channel in a frequency domain is calculated in response to the plurality of subcarrier signals. In an embodiment, spatial-frequency correlation 903 executed by processor 910 performs at least a portion of this function as described herein and illustrated in FIGS. 9-10. In an embodiment, spatial-frequency correlation 903 executed by processor 910 performs at least portions of the following functions described in method 800.

At 803 a frequency-offset estimation and a time-offset estimation is calculated. In an embodiment, timing-frequency-offset compensations 903b of spatial-frequency correlation 903 as shown in FIG. 10 is used.

At 804 the frequency-offset estimation and the time-offset estimation is applied to the channel in the frequency domain to obtain a timing-frequency-offset compensated channel in the frequency domain. In an embodiment, timing-frequency-offset compensations 903b of spatial-frequency correlation 903 is used.

At 805 the timing-frequency-offset compensated channel in a time domain is vectorized to obtain a vector of the timing-frequency-offset compensated channel in the time domain. In an embodiment, spatial frequency vectorization 903c of spatial-frequency correlation 903 is used.

At 806 the vector is correlated to obtain a spatial-frequency correlation with or without an average power value. In an embodiment, an Eigen decomposition of the spatial-frequency correlation with or without an average power value is obtained. In an embodiment, correlation 903d of spatial-frequency correlation 903 is used.

Figure 9:
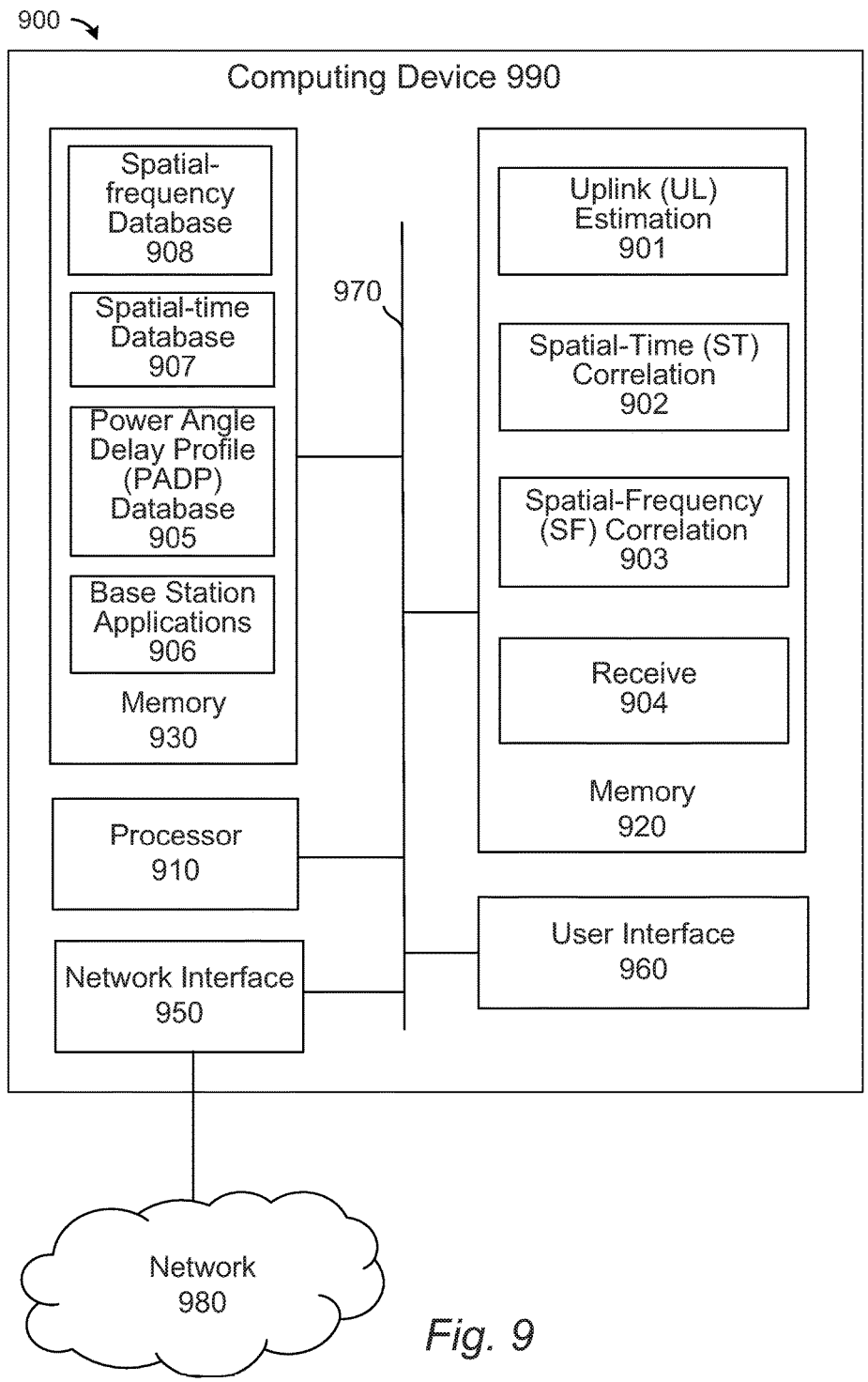
FIG. 9 is a block diagram that illustrates a hardware architecture according to embodiments of the present technology.

FIG. 9 illustrates a hardware architecture 900 for a computing device 990 that obtains a high dimensional (HiDi) radio environment representation. In an embodiment, computing device 990 is included in a base station having an antenna that communicates with user equipment in a cellular network. In embodiments, computing device 990 obtains and stores PADPs for particular geographical locations in a cellular network, such as cellular network 100 shown in FIG. 1. In an embodiment, computing device 990 obtains and stores spatial-time and/or spatial frequency correlations with or without average power values, as described herein, for particular geographical locations in the cellular network, such as for a particular cell. The PADPs may be stored in a database, such as PADP database 905 stored in memory 930. Similarly, spatial-time correlations with or without average power values may be stored in database 907 and frequency-time correlations with or without average power values may be stored in database 908. In an embodiment, base station applications 906 may access values in PADP database 905, spatial-time correlation database 905 and/or spatial-frequency database 908 to improve the management and/or performance of communication with user equipment.

Computing device 990 may include a processor 910, memories 920-930, a user interface 960 and network interface 950 coupled by a interconnect 970. Interconnect 970 may include a bus for transferring signals having one or more type of architectures, such as a memory bus, memory controller, a peripheral bus or the like.

Computing device 990 may be implemented in various embodiments. Computing devices may utilize all of the hardware and software components shown, or a subset of the components in embodiments. Levels of integration may vary depending on an embodiment. For example, memory 920 may comprise many more memories.

Furthermore, a computing device 990 may contain multiple instances of a component, such as multiple processors (cores), memories, databases, transmitters, receivers, etc. Computing device 990 may comprise a processor equipped with one or more input/output devices, such as network interfaces, storage interfaces, and the like.

In an embodiment, computing device 990 may be a mainframe computer that accesses a large amount of data related to a cellular network stored in a database. In an alternate embodiment, computing device 990 may be embodied as different type of computing device. In an embodiment, types of computing devices include but are not limited to, tablet, netbook, laptop, desktop, embedded, server and/or super (computer).

Memory 920 stores uplink (UL) estimation 901, spatial-time correlation 902, spatial-frequency (SF) correlation 903 and receive 904 that includes computer instructions embodied in respective computer programs. In embodiments, other computer programs such as an operating system having a scheduler, application(s) are stored in memory 920.

Memory 930 stores PADP database 905, spatial-time correlation database 907, spatial-frequency database 908 and base station applications 906 that similarly includes computer instructions embodied in respective computer programs. In an embodiment, PADP database 905 includes PADPs or power values, for horizontal arrival angles and vertical arrival angles at time delays per ray in a plurality of rays received by an antenna for particular geographical locations as described herein and shown in FIGS. 2 and 3A. Similarly, spatial-time correlation database 907 and spatial-frequency database 908 that include correlations with or without average power values for particular geographical locations, such as GPS coordinates, in a cellular network as calculated by spatial-temporal and frequency-temporal correlations as described herein (such as illustrated in FIGS. 4A and 5A.

In an embodiment, base station applications 906 may include base station applications that may aid in managing a base station as well as improving communication with user equipment in a cellular network of the base station. In an embodiment, base station applications 906 may include, but are not limited to, a user handover, radio resource management, link adaptation, filter and channel estimation applications.

In an embodiment, processor 910 may include one or more types of electronic processors having one or more cores. In an embodiment, processor 910 is an integrated circuit processor that executes (or reads) computer instructions that may be included in code and/or computer programs stored on a non-transitory memory to provide at least some of the functions described herein. In an embodiment, processor 910 is a multi-core processor capable of executing multiple threads. In an embodiment, processor 910 is a digital signal processor, baseband circuit, field programmable gate array, digital logic circuit and/or equivalent.

A thread of execution (thread or hyper thread) is a sequence of computer instructions that can be managed independently in one embodiment. A scheduler, which may be included in an operating system, may also manage a thread. A thread may be a component of a process, and multiple threads can exist within one process, executing concurrently (one starting before others finish) and sharing resources such as memory, while different processes do not share these resources. In an embodiment, the threads of a process share its instructions (executable code) and its context (the values of the process's variables at any particular time).

In a single core processor, multithreading is generally implemented by time slicing (as in multitasking), and the single core processor switches between threads. This context switching generally happens often enough that users perceive the threads or tasks as running at the same time. In a multiprocessor or multi-core processor, multiple threads can be executed in parallel (at the same instant), with every processor or core executing a separate thread at least partially concurrently or simultaneously.

Memories 920 and 930 may comprise any type of system memory such as static random access memory (SRAM), dynamic random access memory (DRAM), synchronous DRAM (SDRAM), read-only memory (ROM), a combination thereof, or the like. In an embodiment, a memory 920 may include ROM for use at boot-up, and DRAM for program and data storage for use while executing computer instructions. In embodiments, memories 920 and 930 are non-transitory or non-volatile integrated circuit memory storage.

Further, memories 920 and 930 may comprise any type of memory storage device configured to store data, store computer programs including instructions, and store other information and to make the data, computer programs, and other information accessible via interconnect 970. Memories 920 and 930 may comprise, for example, one or more of a solid state drive, hard disk drive, magnetic disk drive, optical disk drive, or the like.

Computing device 990 also includes one or more network interfaces 950, which may comprise wired links, such as an Ethernet cable or the like, and/or wireless links to access network 980. A network interface 950 allows computing device 990 to communicate with remote computing devices and/or other cellular networks. For example, a network interface 950 may provide wireless communication via one or more transmitters/transmit antennas and one or more receivers/receive antennas.

Computing device 990 communicates or transfers information by way of network 980. In an embodiment, network 980 include a plurality of base stations in a cellular network or geographical regions and associated electronic interconnections. In an embodiment, network 980 may be wired or wireless, singly or in combination. In an embodiment, network 980 may be the Internet, a wide area network (WAN) or a local area network (LAN), singly or in combination.

In an embodiment, network 980 may include a High Speed Packet Access (HSPA) network, or other suitable wireless systems, such as for example Wireless Local Area Network (WLAN) or Wi-Fi (Institute of Electrical and Electronics Engineers' (IEEE) 802.11x). In an embodiment, computing device 990 uses one or more protocols to transfer information or packets, such as Transmission Control Protocol/Internet Protocol (TCP/IP) packets.

In embodiments, computing device 990 includes input/output (I/O) computer instructions as well as hardware components, such as I/O circuits to receive and output information from and to other computing devices and/or BSs, via network 980. In an embodiment, an I/O circuit may include at least a transmitter and receiver circuit.

In embodiments, functions described herein are distributed to other or more computing devices. In embodiments, computing device 990 may act as a server that provides a service while one or more UE, computing devices and/or associated base stations may act as a client. In an embodiment, computing device 990 and another computing device may act as peers in a peer-to-peer (P2P) relationship.

User interface 960 may include computer instructions as well as hardware components in embodiments. A user interface 960 may include input devices such as a touchscreen, microphone, camera, keyboard, mouse, pointing device and/or position sensors. Similarly, a user interface 960 may include output devices, such as a display, vibrator and/or speaker, to output images, characters, vibrations, speech and/or video as an output. A user interface 960 may also include a natural user interface where a user may speak, touch or gesture to provide input.

FIG. 10 illustrates a software architecture 1000 according to embodiments of the present technology. Software architecture 1000 illustrates software components having computer instructions to obtain a HiDi radio environment representation. In embodiments, software components illustrated in software architecture 1000 are stored in memory 920 of FIG. 9. In embodiments, software components illustrated in FIGS. 9 and 10 may be embodied as a computer program, object, function, subroutine, method, software instance, script, code fragment, stored in an electronic file, singly or in combination. In order to clearly describe the present technology, software components shown in FIG. 10 are described as individual software components. In embodiments, the software components illustrated in FIG. 10, singly or in combination, may be stored (in single or distributed computer-readable storage medium(s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software architecture 1000 includes UL estimation 901, ST correlation 902 and SF correlation 903.

In embodiments, UL estimation 901 includes angle domain (DOA) based channel estimation 901a, frequency-offset compensation 901b, inverse fast fourier transform (IFFT) 901c, time-offset compensation 901d and expect 901e.

DOA based channel estimation 901a is responsible for, among other functions, outputting complex channel values in response to receiving a plurality of OFDM signals from an antenna. In embodiments, a plurality of received signals $\{Y\}$ include a received signal set $\{y_{mk}\}$ over multiple time instances, where $y_{mk}$ is a received signal at the m-th antenna, k-th subcarrier. In an embodiment, DOA based channel estimation 901a outputs complex channel values for a horizontal angle of arrival and vertical angle of arrival per ray in a plurality of rays received—$\{[H_k(\theta_s,\phi_s), \theta_s, \phi_s]|s=1, \ldots N_{rays}\}$. In an embodiment, DOA based channel estimation 901a outputs an estimated channel state in the frequency domain.

In an embodiment, DOA based channel estimation 901a is calculated by using an array signal processing method include one of N-point DFT steering, MVDR and MUSIC. In an embodiment, DOA based channel estimation 901a calculates a channel estimation before receiving signals.

Frequency-offset compensation 901b is responsible for, among other functions, providing a frequency-offset compensation to the complex channel values output from DOA based channel estimation 901a. In an embodiment, a frequency-offset compensation is applied as illustrated in frequency-offset equations 375 of FIG. 3C, and in particular a frequency-offset estimation is applied using equation 380. Frequency-offset compensation 901b outputs frequency compensated complex channel values $\{[H'_k(\theta_s,\phi_s), \theta_s, \phi_s]|s=1, \ldots N_{rays}\}$ to IFFT 901c.

IFFT 901c is responsible for, among other functions, performing an inverse fast fourier transform on frequency compensated complex channel values $\{[H'_k(\theta_s,\phi_s), \theta_s, \theta_s]|s=1, \ldots N_{rays}\}$ to output an estimated channel state in the time domain $\{[h'_k(\theta_s, \theta_s), \theta_s, \phi_s, \tau'_s]|s=1, \ldots N_{rays}\}$ that is input to time-offset compensation 901d.

Time-offset compensation 901d is responsible for, among other functions, providing a time-offset compensation to an estimated channel state in the time domain $\{[h'_k(\theta_s, \theta_s), \theta_s, \phi_s, \tau'_s]|s=1, N_{rays}\}$. In an embodiment, a time-offset compensation is applied as illustrated in time-offset compensation estimation equations 350 of FIG. 3B, and in particular a time-offset estimation is applied using equation 356. Time-offset compensation 901d outputs time compensated channel values $\{[h(\theta_s,\phi_s), \theta_s, \phi_s, \tau'_s-\tau'_1]|s=1, \ldots N_{rays}\}$ with a time compensation to expected 901e.

Expected 901e is responsible for, among other functions, providing an expected value or average of time compensated channel values in the time domain $h(\theta_s,\phi_s)$ to obtain an average power value $P_s$ for a horizontal angle of arrival, vertical angle of arrival and time delay per ray in a plurality of rays received.

In embodiments, ST correlation 902 includes frequency domain channel estimation 902a, frequency-offset compensation 902b, IFFT 902c, time-offset compensation 902d, spatial-temporal vectorization 902e and spatial-temporal channel impulse response correlation 902f.

Frequency domain channel estimation 902a is responsible for, among other functions, obtaining a frequency domain channel estimation. In an embodiment, Frequency domain channel estimation 902a operates similar to DOA based channel estimation 901a. In embodiments, a plurality of received signals $\{Y\}$ include a received signal set $\{y_{mk}\}$ over multiple time instances, where $y_{mk}$ is a received signal at the m-th antenna, k-th subcarrier. In an embodiment, frequency domain channel estimation 902a outputs an estimated channel state in the frequency domain $\{H\}$.

Frequency-offset compensation 902b is responsible for, among other functions, providing a frequency-offset compensation to an estimated channel state in the frequency domain $\{H\}$. In an embodiment, a frequency-offset compensation is applied as illustrated in frequency offset equations 375 of FIG. 3C, and in particular a frequency-offset estimation is applied using equation 380. Frequency-offset compensation 902b outputs frequency compensated estimated channel state in the frequency domain $\{H'\}$ to IFFT 902c

IFFT 902c is responsible for, among other functions, performing an inverse fast fourier transform on a frequency compensated estimated channel state in the frequency domain $\{H'\}$ to output an estimated channel state in the time domain $\{h'\}$ that is input to time-offset compensation 902d.

Time-offset compensation 902d is responsible for, among other functions, providing a time-offset compensation to an estimated channel state in the time domain $\{h'\}$. In an embodiment, a time-offset compensation is applied as illustrated in time-offset compensation estimation equations 350 of FIG. 3B, and in particular a time-offset estimation is applied using equation 356. Timing-offset compensation 902*d* outputs estimated channel state in the time domain {h} to spatial-temporal vectorization 902*e*.

Spatial-temporal vectorization 902*e* is responsible for, among other functions, forming a {vec(h)} or vectorizing the estimated channel state in the time domain {h}.

Spatial-temporal channel impulse response (CIR) correlation 902*f* is responsible for, among other functions, obtaining a spatial-time correlation $R_{ST}$ from vector {vec(h)}. In an embodiment, an average power value P may be obtained by an Eigen decompensation of the spatial-time correlation $R_{ST}$.

In embodiments, SF correlation 903 includes frequency domain channel estimation 903*a*, time-frequency-offset compensations 903*b*, spatial frequency vectorization 903*c* and correlation 903*d*.

Frequency domain channel estimation 903*a* is responsible for, among other functions, obtaining a frequency domain channel estimation {H} in response to a plurality of received signals {Y}. In an embodiment, frequency domain channel estimation 903*a* functions similarly to frequency domain channel estimation 902*a* described herein.

Time-frequency-offset compensations 903*b* is responsible for, among other functions, providing time and frequency offset compensations to a frequency domain channel estimation to output a time and frequency compensated frequency domain channel estimation {H'}. In an embodiment, time-frequency-offset compensations 903*b* functions similarly to frequency-offset compensation 902*b* and time-offset compensation 902*d* as described herein.

Spatial-frequency vectorization 903*c* is responsible for, among other functions, forming a {vec(H)} or vectorizing the time and frequency compensated estimated channel state {H'}. In an embodiment, spatial-frequency vectorization 903*c* functions similarly to spatial-temporal vectorization 902*e* as described herein.

Correlation 903*d* is responsible for, among other functions, is responsible for, obtaining a spatial-frequency correlation $R_{SF}$ from vector {vec(H)}. In an embodiment, an average power value P may be obtained by an Eigen decompensation of the spatial-time correlation $R_{SF}$. In an embodiment, correlation 903*d* functions similarly to spatial-temporal CIR correlation 902*f* as described herein.

Receive 904 is responsible for in embodiments, among other functions, obtaining a plurality of received signal values from an antenna or a plurality of antenna elements at a base station. Receive 904 is also responsible for obtaining a geographical location, such as global position system (GPS) coordinates or other indication of location, for a UE transmitting to a base station in an embodiment. Receive 904 is responsible for storing and/or retrieving PADPs and/or spatial-time and spatial-frequency correlations with or without average power values associated with respective geographical locations in a cell in an embodiment. In still other embodiments, receive 904 may be responsible for averaging, such as average power values in a set of power values.

Advantages of the present technology may include, but are not limited to, having a HiDi radio environment representation that has relatively better uniqueness for particular locations as compared to a typical radio representation. Localization may be accomplished with a HiDi radio environment representation, particularly when a UE is at a location where no line-of-sight (LoS) channel path exists.

The present HiDi radio environment representation technology may provide improved performance, such as improved channel estimation, for multi-antenna systems as compared to one-dimensional radio environment representations. With a HiDi radio environment representation, appropriate channel estimation filters may be applied to improve channel estimation performance after a particular geographical location has been detected.

Interference from neighboring base stations may be estimated for a particular UE communicating with a multi-antenna multi-input and multi-output (MIMO) base station with linear precoding; consequently, link adaption may be improved in an embodiment.

A cellular network may detect a location of a UE and retrieve channel characteristics for the UE from different cells even when the UE is not associated with the cell. A serving base station may then prepare a handover in advance for the UE to the appropriate cell.

Further, the present HiDi radio environment representation technology may enable accurate signal-to-interference-plus-noise ratio (SINR) estimations for multi-user (MU) MIMO cellular networks with channel covariance of the in cell UE's when performing MU-MIMO pairing and scheduling. This may achieve better resource management, particularly for large-scale MIMO cellular networks, in an embodiment.

ST and SF correlation based HiDi radio environment representations may work well for cellular networks with a limited number of antennas, such as current long-term evolution (LTE) systems.

With spatial channel statistical information encapsulated, HiDi radio environment representations may facilitate multi-cell MIMO coordination and cellular network optimization in an embodiment.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, a device having one or more processors executing instructions stored in non-transitory memory, a computer-implemented method, and/or a non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

Additional embodiments are illustrated herein by the following clauses.

Clause 1. A device comprises a non-transitory memory storing instructions and one or more processors in communication with the non-transitory memory. The one or more processors execute the instructions to obtain a plurality of received signals transmitted by a user equipment from a plurality of antenna elements in a cellular network. A plurality of complex channel values are calculated in an angle domain for a horizontal arrival angle and a vertical arrival angle per a received ray in a plurality of received rays in response to the plurality of received signals. A frequency-offset estimation is calculated for the plurality of complex channel values. The frequency-offset estimation is applied to the plurality of complex channel values to obtain a plurality of offset complex channel values for the horizontal arrival angle and the vertical arrival angle per the received ray. The plurality of offset complex channel values for the horizontal arrival angle and the vertical arrival angle per the received ray are transformed to a plurality of channel values in a time domain for the horizontal arrival angle and vertical arrival angle with a first time delay per the received ray. A time-offset estimation is calculated for the plurality of channel values in the time domain. The time-offset estimation for the plurality of channel values in the time domain is applied to obtain a plurality of channel values for the horizontal arrival angle and vertical arrival angle with a second time delay per the received ray. An expected value of the plurality of channel values is calculated to obtain a power value for the horizontal arrival angle and vertical arrival angle having a second time delay per the received ray.

Clause 2. The device of clause 1, wherein obtain the plurality of received signals include obtain a plurality of orthogonal frequency-division multiplexing (OFDM) signals and the plurality of antenna elements are included in a multiple-input and multiple-output (MIMO) antenna.

Clause 3. The device of any one of clauses 1-2, wherein the plurality of OFDM signals include a plurality of sounding reference signals in a plurality of subcarrier signals of a resource block transmitted by the user equipment.

Clause 4. The device of any one of clauses 1-3, wherein calculate a plurality of complex channel values in the angle domain includes: obtain an angle domain based channel estimation and providing the plurality of received signals to the angle domain based channel to obtain the plurality of complex channel values.

Clause 5. The device of any one of clauses 1-4, wherein obtain the angle domain based channel estimation includes using an array signal processing that includes one of N-point discrete fourier transform (DFT) steering, minimum variance distortionless response (MVDR) and multiple signal classification (MUSIC).

Clause 6. The device of any one of the clauses 1-5, wherein the one or more processors execute the instructions to: obtain a geographical location for the user equipment and store the power value, the horizontal arrival angle, vertical arrival angle and a second time delay per the received ray for the geographical location in another non-transitory memory.

Clause 7. The device of any one of the clauses 1-6, wherein the device is included in a base station having the plurality of antenna elements for communicating with the user equipment in the cellular network, wherein the one or more processors execute the instructions to: retrieve the power value, the horizontal arrival angle, vertical arrival angle and a second time delay per the received ray for the geographical location to use in one of user handover, radio resource management, link adaptation and channel estimation in the base station.

Clause 8. A computer-implemented method for a base station having a plurality of antennas to communicate with a user equipment in a cellular network comprises the steps of: receiving a plurality of subcarrier signals in an orthogonal frequency-division multiplexing (OFDM) signal at a plurality of time intervals transmitted by the user equipment from the plurality of antennas. A channel in a frequency domain is calculated in response to the plurality of subcarrier signals. A frequency-offset estimation is calculated. The frequency-offset estimation is applied to the channel in the frequency domain to obtain a frequency-offset compensated channel in the frequency domain. The frequency-offset compensated channel in the frequency domain is transformed to a channel in a time domain. A time-offset estimation is calculated. The time-offset estimation to the channel in the time domain is applied to obtain a time-offset compensated channel in the time domain. The time-offset compensated channel in the time domain is vectorized to obtain a vector of the time-offset compensated channel in the time domain. The vector is correlated to obtain a spatial-time correlation.

Clause 9. The computer-implemented method of clause 8, wherein the plurality of subcarrier signals include a plurality of sounding reference signals in a resource block transmitted by the user equipment.

Clause 10. The computer-implemented method of any one of the clauses 8-9, wherein calculating the frequency-offset estimation includes calculating the frequency-offset estimation based on an OFDM symbol index.

Clause 11. The computer-implemented method of any one of the clauses 8-10, wherein correlating the vector to obtain a spatial-time correlation includes correlating the vector to obtain an Eigen decomposition of the spatial time correlation with or without an average power value.

Clause 12. The computer-implemented method of any one of the clauses 8-11, further comprising: obtaining a geographical location for the user equipment; and storing the spatial-time correlation or Eigen decomposition of spatial-time correlation, with or without an average power value associated with the geographical location in a database stored in non-transitory memory.

Clause 13. The computer-implemented method of any one of the clauses 8-12, further comprising: retrieving the spatial-time correlation or Eigen decomposition of spatial-time correlation, with or without an average power value associated with the geographical location; and using the spatial-time correlation or Eigen decomposition of spatial-time correlation, with or without the average power value in a base station application that includes one of a user handover, radio resource management, link adaptation and channel estimation.

Clause 14. The computer-implemented method of any one of the clauses 8-13, wherein calculating the frequency-offset estimation is based on an OFDM symbol period and wherein calculating the time-offset estimation is based on a subcarrier spacing in an OFDM signal.

Clause 15. A non-transitory computer-readable medium storing computer instructions, that when executed by one or more processors, cause one or more processors to: receive a plurality of subcarrier signals in an orthogonal frequency-division multiplexing (OFDM) signal at a plurality time intervals transmitted by a user equipment from a plurality of antennas at a base station in a cellular network. A channel in a frequency domain is calculated in response to the plurality of subcarrier signals. A frequency-offset estimation is calculated. A time-offset estimation is calculated. The frequency-offset estimation and the time-offset estimation to the channel in the frequency domain is applied to obtain a time-frequency-offset compensated channel in the frequency domain. The time-frequency-offset compensated channel in a time domain is vectorized to obtain a vector of the time-frequency-offset compensated channel in the time domain. The vector is correlated to obtain a spatial-frequency correlation.

Clause 16. The non-transitory computer-readable medium of clause 15, wherein correlating the vector to obtain a spatial-frequency correlation includes correlating the vector to obtain an Eigen decomposition of the spatial-frequency correlation with or without an average power value Clause 17. The non-transitory computer-readable medium of any one of the clauses 15-16, further comprising computer instructions causing one or more processors to: obtaining a geographical location for the user equipment; and storing the spatial-frequency correlation or Eigen decomposition of the spatial-time correlation, with or without the average power value associated with the geographical location in a database stored in non-transitory memory.

Clause 18. The non-transitory computer-readable medium of any one of the clauses 15-17, further comprising computer instructions causing one or more processors to: retrieving the spatial-frequency correlation or Eigen decomposition of the spatial-time correlation, with or without the average power value associated with the geographical location; and using the spatial-frequency correlation or Eigen decomposition of the spatial-time correlation, with or without the average power value in a base station application that includes one of a user handover, radio resource management, link adaptation and channel estimation.

Clause 19. The non-transitory computer-readable medium of any one of the clauses 15-18, wherein calculating the frequency-offset estimation is based on an OFDM symbol period and calculating the time-offset estimation is based on an OFDM subcarrier spacing.

Clause 20. The non-transitory computer-readable medium of any one of the clauses 15-19, wherein the vectorizing is based on a number of frequency domain channel sampling points.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A device comprising:
  a non-transitory memory storing instructions; and
  one or more processors in communication with the non-transitory memory, wherein the one or more processors execute the instructions to:
    obtain a plurality of received signals transmitted by a user equipment from a plurality of antenna elements in a cellular network;
    calculate a plurality of complex channel values in an angle domain for a horizontal arrival angle and a vertical arrival angle per a received ray in a plurality of received rays in response to the plurality of received signals,
calculate a frequency-offset estimation for the plurality of complex channel values;
apply the frequency-offset estimation to the plurality of complex channel values to obtain a plurality of offset complex channel values for the horizontal arrival angle and the vertical arrival angle per the received ray;
transform the plurality of offset complex channel values for the horizontal arrival angle and the vertical arrival angle per the received ray to a plurality of channel values in a time domain for the horizontal arrival angle and vertical arrival angle with a first time delay per the received ray;
calculate a time-offset estimation for the plurality of channel values in the time domain;
apply the time-offset estimation to the plurality of channel values in the time domain to obtain a plurality of channel values for the horizontal arrival angle and vertical arrival angle with a second time delay per the received ray; and
calculate an expected value of the plurality of channel values to obtain a power value for the horizontal arrival angle and vertical arrival angle having a second time delay per the received ray.

2. The device of claim 1, wherein obtain the plurality of received signals include obtain a plurality of orthogonal frequency-division multiplexing (OFDM) signals and the plurality of antenna elements are included in a multiple-input and multiple-output (M IMO) antenna.

3. The device of claim 2, wherein the plurality of OFDM signals include a plurality of sounding reference signals in a plurality of subcarrier signals of a resource block transmitted by the user equipment.

4. The device of claim 3, wherein calculate a plurality of complex channel values in the angle domain includes: obtain an angle domain based channel estimation and providing the plurality of received signals to the angle domain based channel to obtain the plurality of complex channel values.

5. The device of claim 4, wherein obtain the angle domain based channel estimation includes using an array signal processing that includes one of N-point discrete fourier transform (DFT) steering, minimum variance distortionless response (MVDR) and multiple signal classification (MUSIC).

6. The device of claim 1, wherein the one or more processors execute the instructions to: obtain a geographical location for the user equipment and store the power value, the horizontal arrival angle, vertical arrival angle and a second time delay per the received ray for the geographical location in another non-transitory memory.

7. The device of claim 6, wherein the device is included in a base station having the plurality of antenna elements for communicating with the user equipment in the cellular network, wherein the one or more processors execute the instructions to: retrieve the power value, the horizontal arrival angle, vertical arrival angle and a second time delay per the received ray for the geographical location to use in one of user handover, radio resource management, link adaptation and channel estimation in the base station.

8. A computer-implemented method for a base station having a plurality of antennas to communicate with a user equipment in a cellular network, comprising the steps of:
receiving a plurality of subcarrier signals in an orthogonal frequency-division multiplexing (OFDM) signal at a plurality of time intervals transmitted by the user equipment from the plurality of antennas,
calculating a channel in a frequency domain in response to the plurality of subcarrier signals;
calculating a frequency-offset estimation;
applying the frequency-offset estimation to the channel in the frequency domain to obtain a frequency-offset compensated channel in the frequency domain;
transforming the frequency-offset compensated channel in the frequency domain to a channel in a time domain;
calculating a time-offset estimation;
applying the time-offset estimation to the channel in the time domain to obtain a time-offset compensated channel in the time domain;
vectorizing the time-offset compensated channel in the time domain to obtain a vector of the time-offset compensated channel in the time domain; and
correlating the vector to obtain a spatial-time correlation.

9. The computer-implemented method of claim 8, wherein the plurality of subcarrier signals include a plurality of sounding reference signals in a resource block transmitted by the user equipment.

10. The computer-implemented method of claim 9, wherein calculating the frequency-offset estimation includes calculating the frequency-offset estimation based on an OFDM symbol index.

11. The computer-implemented method of claim 10, wherein correlating the vector to obtain a spatial-time correlation includes correlating the vector to obtain an Eigen decomposition of the spatial time correlation with or without an average power value.

12. The computer-implemented method of claim 11, further comprising:
obtaining a geographical location for the user equipment; and
storing the spatial-time correlation or Eigen decomposition of spatial-time correlation, with or without an average power value associated with the geographical location in a database stored in non-transitory memory.

13. The computer-implemented method of claim 12, further comprising:
retrieving the spatial-time correlation or Eigen decomposition of spatial-time correlation, with or without an average power value associated with the geographical location; and
using the spatial-time correlation or Eigen decomposition of spatial-time correlation, with or without the average power value in a base station application that includes one of a user handover, radio resource management, link adaptation and channel estimation.

14. The computer-implemented method of claim 10, wherein calculating the frequency-offset estimation is based on an OFDM symbol period and wherein calculating the time-offset estimation is based on a subcarrier spacing in an OFDM signal.

15. A non-transitory computer-readable medium storing computer instructions, that when executed by one or more processors, cause one or more processors to:
receiving a plurality of subcarrier signals in an orthogonal frequency-division multiplexing (OFDM) signal at a plurality time intervals transmitted by a user equipment from a plurality of antennas at a base station in a cellular network;
calculating a channel in a frequency domain in response to the plurality of subcarrier signals;
calculating a frequency-offset estimation;
calculating a time-offset estimation;

applying the frequency-offset estimation and the time-offset estimation to the channel in the frequency domain to obtain an time-frequency-offset compensated channel in the frequency domain;

vectorizing the time-frequency-offset compensated channel in a time domain to obtain a vector of the time-frequency-offset compensated channel in the time domain; and correlating the vector to obtain a spatial-frequency correlation.

16. The non-transitory computer-readable medium of claim 15, wherein correlating the vector to obtain a spatial-frequency correlation includes correlating the vector to obtain an Eigen decomposition of the spatial-frequency correlation with or without an average power value.

17. The non-transitory computer-readable medium of claim 16, further comprising computer instructions causing one or more processors to:

obtaining a geographical location for the user equipment; and storing the spatial-frequency correlation or Eigen decomposition of the spatial-time correlation, with or without the average power value associated with the geographical location in a database stored in non-transitory memory.

18. The non-transitory computer-readable medium of claim 17, further comprising computer instructions causing one or more processors to:

retrieving the spatial-frequency correlation or Eigen decomposition of the spatial-time correlation, with or without the average power value associated with the geographical location; and using the spatial-frequency correlation or Eigen decomposition of the spatial-time correlation, with or without the average power value in a base station application that includes one of a user handover, radio resource management, link adaptation and channel estimation.

19. The non-transitory computer-readable medium of claim 15, wherein calculating the frequency-offset estimation is based on an OFDM symbol period and calculating the time-offset estimation is based on an OFDM subcarrier spacing.

20. The non-transitory computer-readable medium of claim 15, wherein the vectorizing is based on a number of frequency domain channel sampling points.

* * * * *